US007624159B2

(12) United States Patent
Kohs

(10) Patent No.: US 7,624,159 B2
(45) Date of Patent: Nov. 24, 2009

(54) METHODS AND SYSTEMS FOR TIME-BASING, MATCHING, AND REPORTING DIGITAL RESUMES, DIGITAL JOB ORDERS AND OTHER ELECTRONIC PROPOSALS

(75) Inventor: Jim Kohs, Kingwood, TX (US)

(73) Assignee: Skill Cubes, Inc., Kingswood, TX (US)

( * ) Notice: Subject to any disclaimer, the term of this patent is extended or adjusted under 35 U.S.C. 154(b) by 262 days.

(21) Appl. No.: 10/555,915

(22) PCT Filed: May 6, 2004

(86) PCT No.: PCT/US2004/014107

§ 371 (c)(1),
(2), (4) Date: Nov. 7, 2005

(87) PCT Pub. No.: WO2004/102756

PCT Pub. Date: Nov. 25, 2004

(65) Prior Publication Data
US 2007/0022188 A1    Jan. 25, 2007

Related U.S. Application Data

(60) Provisional application No. 60/468,527, filed on May 7, 2003, provisional application No. 60/468,531, filed on May 7, 2003, provisional application No. 60/468,530, filed on May 7, 2003, provisional application No. 60/468,529, filed on May 7, 2003, provisional application No. 60/468,528, filed on May 7, 2003.

(51) Int. Cl.
*G06F 15/16* (2006.01)

(52) U.S. Cl. .................. 709/217; 709/226; 707/10; 705/9

(58) Field of Classification Search ................ 709/217, 709/226; 707/10; 705/9
See application file for complete search history.

(56) References Cited

U.S. PATENT DOCUMENTS 6,266,659 B1 *  7/2001  Nadkarni ..................... 707/3

(Continued)

*Primary Examiner*—Salad Abdullahi
(74) *Attorney, Agent, or Firm*—HulseyIP Intellectual Property Lawyers, PC

(57) ABSTRACT

An infrastructure system (112) for facilitating the creation of time-based digital resumes (124) and time-based digital job orders (126) and the matching thereof (122), the system including an on-site exchange (118), a private exchange (114), and a public exchange (116). A time-basing method (228) for facilitating preprogrammed time-dependent variation in an electronic proposal. An aspiration matching method (150) for matching (122) a digital resume (124) to a digital job order (126), wherein the digital resume (124) includes at least one resume aspiration, and wherein the digital job order includes at least one job order aspiration, in order to achieve a high level of expected satisfaction between the submitter of the digital resume and the submitter of the digital job order upon consummation of a transaction based on the matching (122) of the resume (124) with the job order (126). A graphical reporting method for reporting feedback based on comparisons of time-based digital resumes and time-based digital job orders.

20 Claims, 29 Drawing Sheets

U.S. PATENT DOCUMENTS

| | | | |
|---|---|---|---|
| 6,289,340 B1* | 9/2001 | Puram et al. | 707/5 |
| 6,385,620 B1* | 5/2002 | Kurzius et al. | 707/104.1 |
| 6,662,194 B1* | 12/2003 | Joao | 707/104.1 |
| 6,742,002 B2* | 5/2004 | Arrowood | 707/104.1 |
| 7,191,138 B1* | 3/2007 | Roy et al. | 705/1 |
| 7,295,991 B1* | 11/2007 | Clarke et al. | 705/8 |
| 2002/0010614 A1* | 1/2002 | Arrowood | 705/9 |
| 2002/0016730 A1* | 2/2002 | Foulger et al. | 705/10 |
| 2002/0111843 A1* | 8/2002 | Wellenstein | 705/8 |
| 2003/0125970 A1* | 7/2003 | Mittal et al. | 705/1 |
| 2004/0039618 A1* | 2/2004 | Cardenas-Vasquez | 705/7 |
| 2004/0148180 A1* | 7/2004 | Pajwani | 705/1 |

* cited by examiner

142

The SkillCube™
A consulting firm's Project Manager paid on utilization, submits his SkillCube™ into the corporate Private Exchange, with visibility limited to the internal SkillReqs™.

He must find work within 30 days, or risk being laid off!

Limited Travel is his Highest priority today, but this is Increasing day by day. He is willing to travel to avoid being laid off.

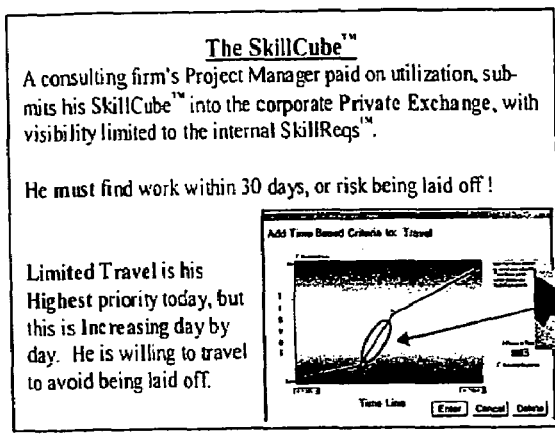

The SkillReq™
The consulting firm's HR Partner needs a Project Manager, for a client contract which begins in four weeks, and submits a SkillReq™ into the corporate Private Exchange, with visibility limited to internal SkillCubes™.

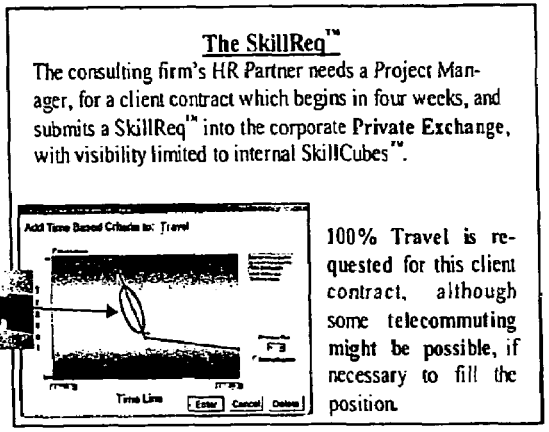

100% Travel is requested for this client contract, although some telecommuting might be possible, if necessary to fill the position.

METHODS AND SYSTEMS FOR TIME-BASING, MATCHING, AND REPORTING DIGITAL RESUMES, DIGITAL JOB ORDERS AND OTHER ELECTRONIC PROPOSALS

CROSS-REFERENCE TO RELATED PATENT APPLICATIONS

This patent application claims the benefit of U.S. Provisional Patent Application No. 60/468,527, filed May 7, 2003 by inventor Jim Kohs; U.S. Provisional Patent Application No. 60/468,531, filed May 7, 2003 by inventor Jim Kohs; U.S. Provisional Patent Application No. 60/468,530, filed May 7, 2003 by inventor Jim Kohs; U.S. Provisional Patent Application No. 60/468,529, filed May 7, 2003 by inventor Jim Kohs; and U.S. Provisional Patent Application No. 60/468,528, filed May 7, 2003 by inventor Jim Kohs.

The U.S. Provisional Patent Applications Nos. 60/468,527, 60/468,528, 60/468,529, 60/468,530, and 60/468,531 are incorporated herein to the maximum extent allowable by law.

TECHNICAL FIELD OF THE DISCLOSURE

This disclosure pertains to methods and systems for time-basing, matching, and reporting digital resumes, digital job orders, and other electronic proposals.

BACKGROUND OF THE DISCLOSURE

The field of human resources does not now contain methods and systems for time-basing, matching, and reporting digital resumes, digital job orders, and other electronic proposals as disclosed herein.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

FIG. 11 further illustrates the matching process of FIGS. 9 and 10 using a user interface of the present invention;

Figures 23, 24, 25:
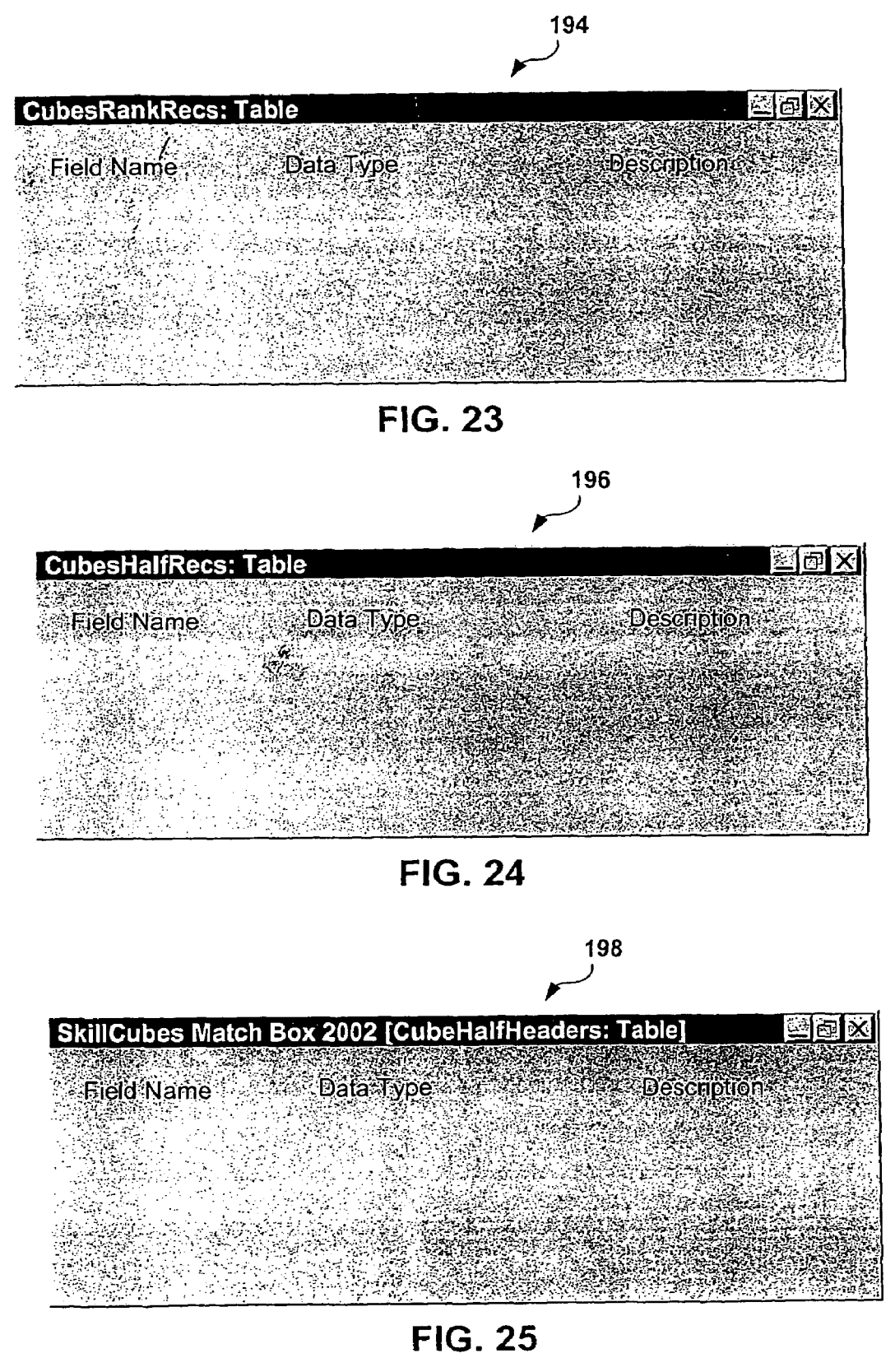

FIGS. 22 through 25 provide a data dictionary of the physical and virtual data schema of the present invention;

FIGS. 28 and 29 provide examples of the user interfaces associated with the digital resume and digital job order creation functions of the present invention;

DETAILED DESCRIPTION

The time-based digital resume aspiration matching process described herein enables unique career aspirations embodied within a set of time-based digital resumes to be analytically matched with the career aspirations embodied within a set of time-based digital job orders. The present embodiment of the aspiration matching process contains five separate processes which interoperate to produce an analytic match between a set of time-based digital resumes and a set of time-based digital job orders. These five processes are the flatten process, the virtual box process, the matchbox process, the backfill process, and the ranking process.

Figure 1:
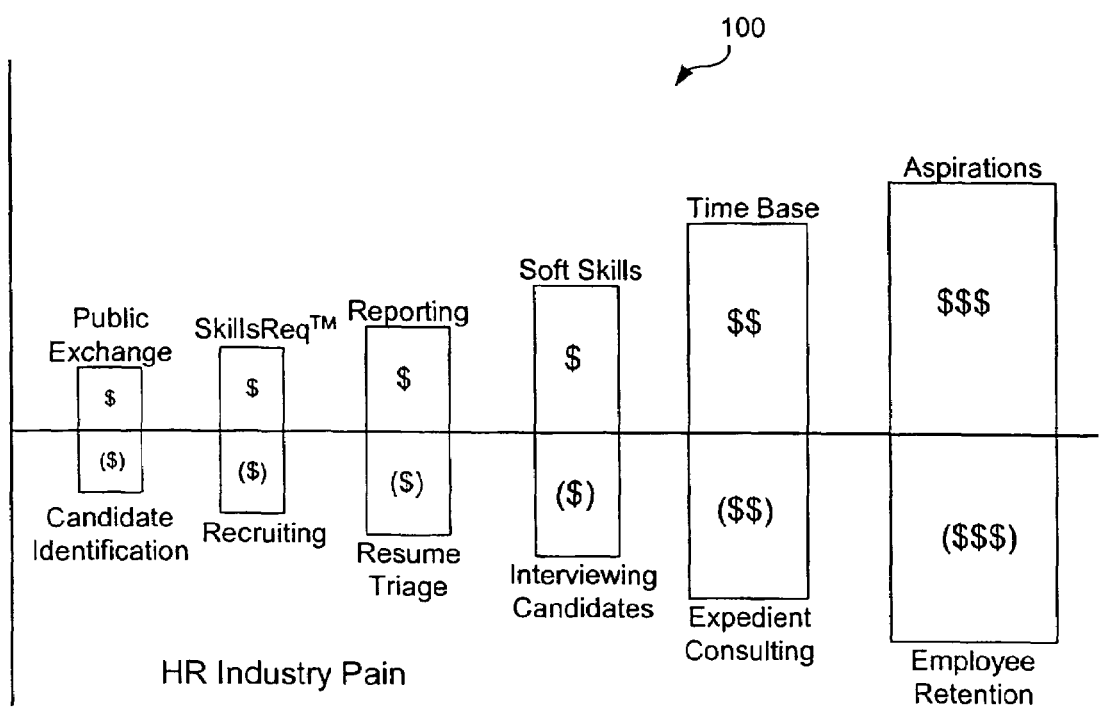
FIG. 1 illustrates the increasing value of the present invention to human resource management professionals during the different human resource management stages.
Figure 2:
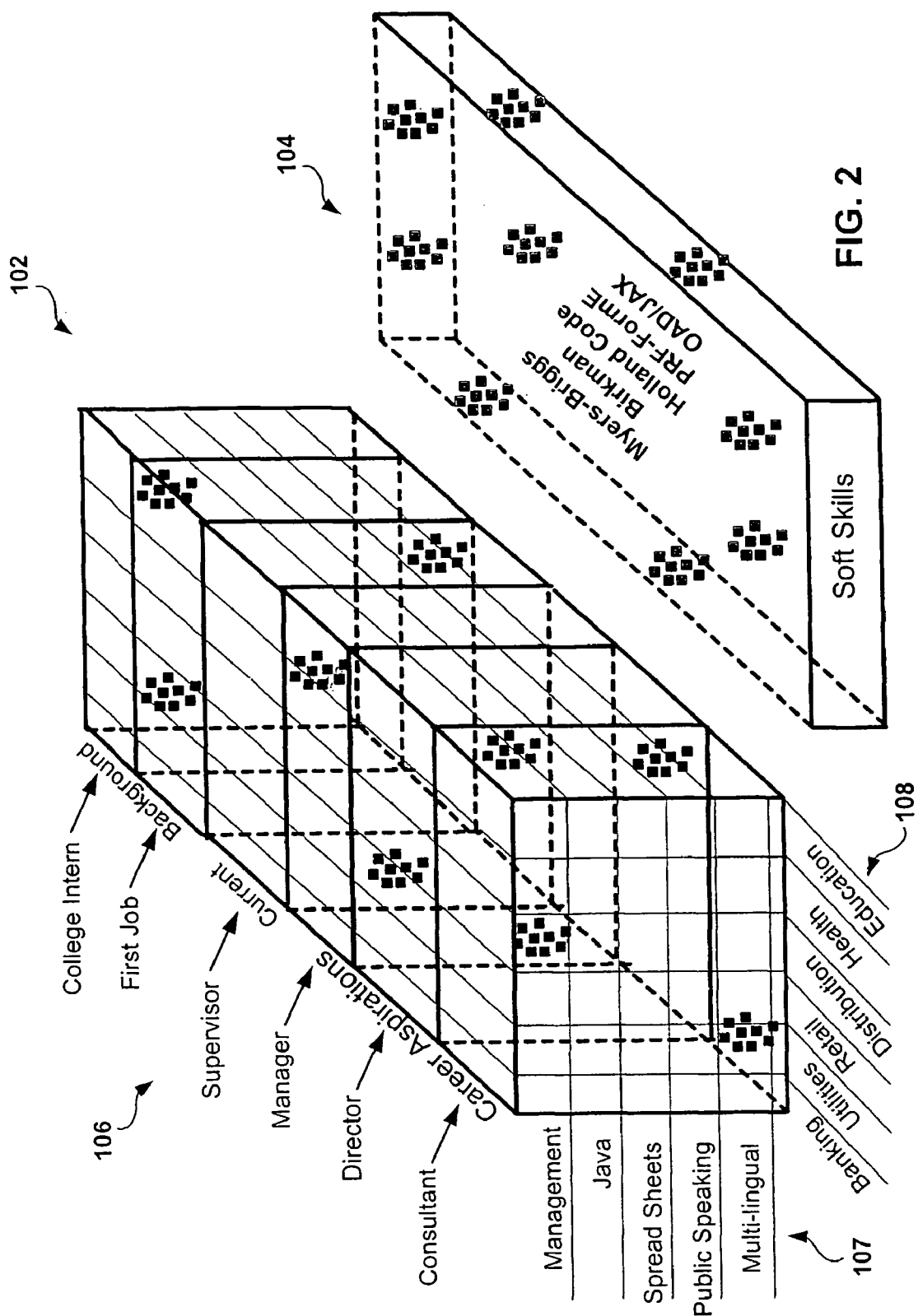
FIG. 2 shows one example of a digital resume formed consistent with the teachings of the present invention.

FIG. 1 illustrates the increasing value 100 of the present invention to human resource management professionals during the different human resource management stages. FIG. 2 shows one example of a digital resume 102 formed consistent with the teachings of the present invention. The resume 102 allows interrelating information on career titles 106, skill areas 107, and industry experience 108. The resume 102 also includes a soft skills section 104.

Figure 3:
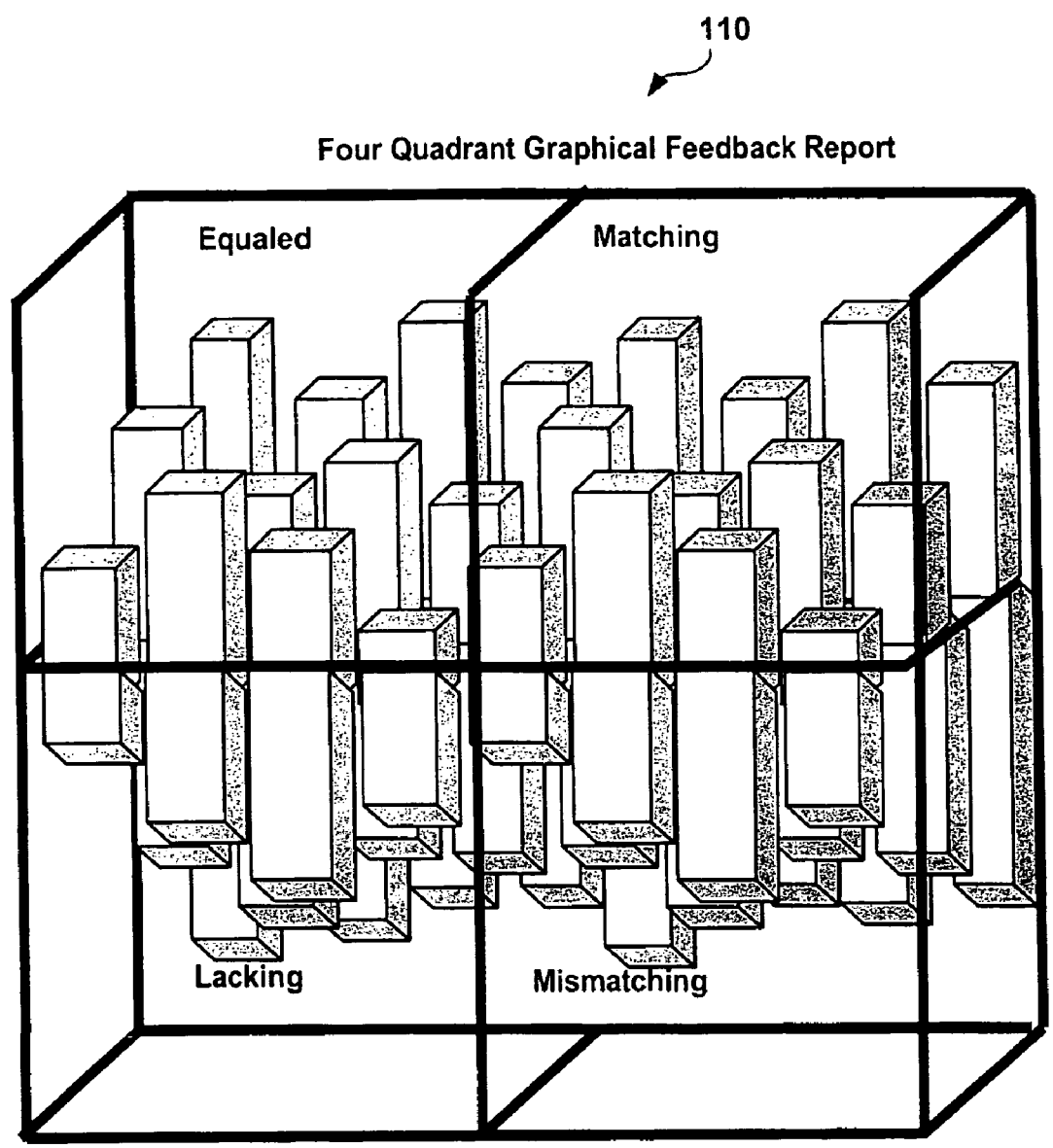
FIG. 3 illustrates one embodiment of the full-color graphical feedback reports of the present invention.
Figure 4:
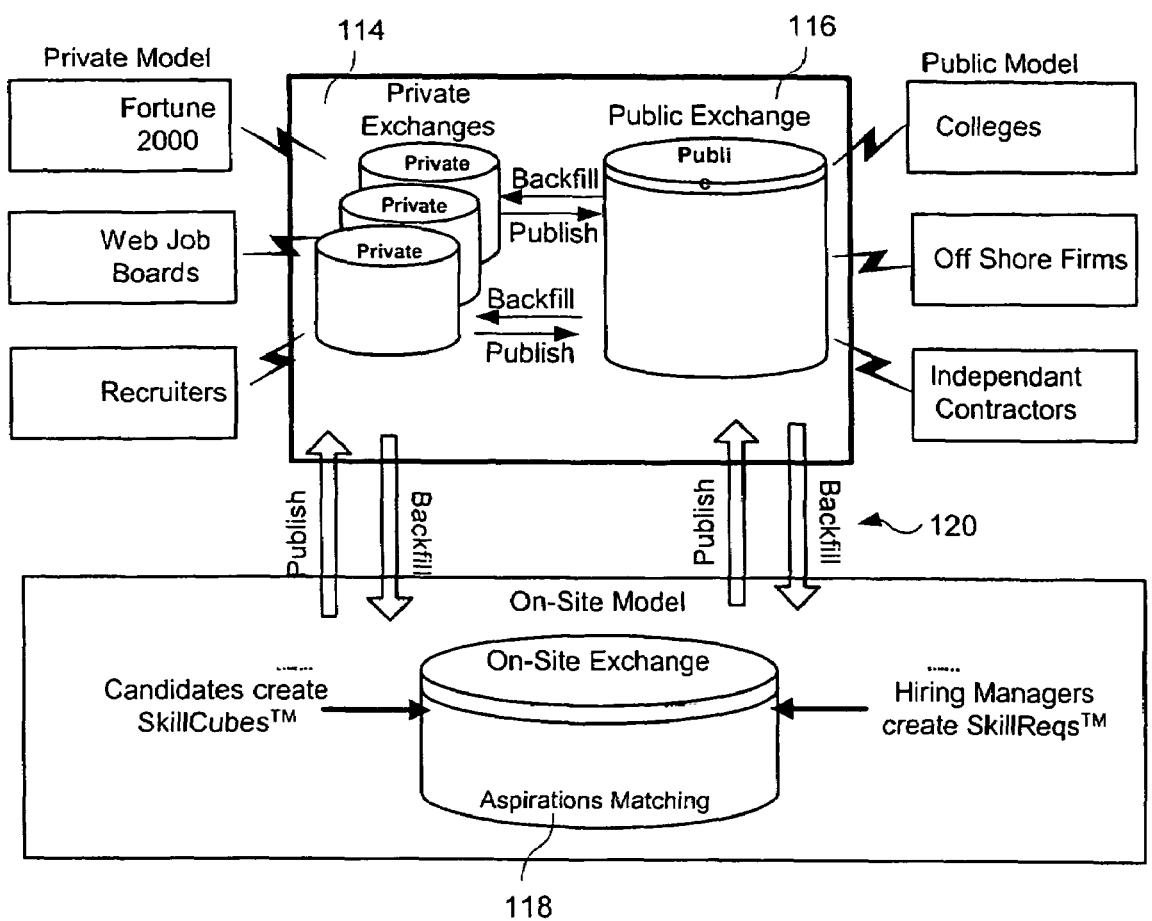
FIG. 4 illustrates a national infrastructure for exchanging time-based digital resumes.
Figure 5:
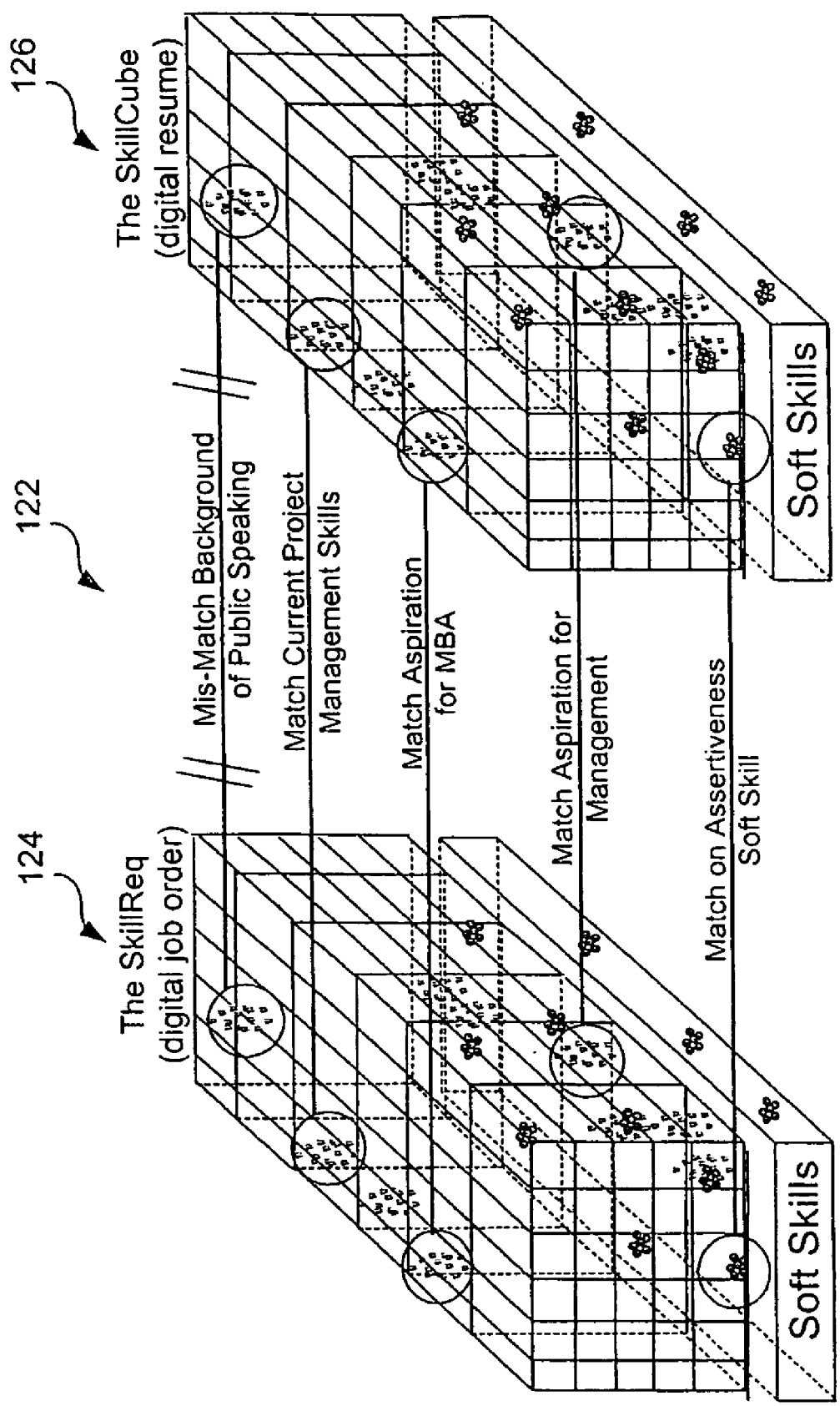
FIG. 5 shows the matching of digital resumes and digital job orders incorporating aligned aspirations.

FIG. 3 illustrates one embodiment 110 of the full-color graphical feedback reports of the present invention. FIG. 4 illustrates a possible national infrastructure 112 for exchanging time-based digital resumes. The infrastructure 112 includes private exchanges 114, at least one public exchange 116, and at least one on-site exchange 118. Electronic proposals can be published and backfilled 120 as desired. FIG. 5 shows the matching 122 of digital resumes 124 and digital job orders 126 incorporating aligned aspirations;

This disclosure provides an infrastructure system for facilitating the creation of time-based digital resumes and time-based digital job orders and the matching thereof, the system including an on-site exchange, a private exchange, and a public exchange. The on-site exchange is for receiving, containing, and matching time-based digital job orders and time-based digital resumes. The private exchange is for receiving, containing, and matching time-based digital job orders and time-based digital resumes. The public exchange is for receiving, containing, and matching time-based digital job orders and time-based digital resumes. The on-site and private exchanges include a front-end platform for interacting with the public exchange to backfill and publish.

The disclosure also provides a time-basing method for facilitating preprogrammed time-dependent variation in an electronic proposal. Time-based input data including one or more gradient value, the data being suitable for dynamic time-dependent variance of values associated with at least one time-based electronic proposal, is received. The time-based electronic proposal is stored. The time-based electronic proposal is compared to one or more other electronic proposals. A match value is calculated for each comparison of the time-based electronic proposal to one of the other electronic proposals.

The disclosure further provides an aspiration matching method for matching a digital resume to a digital job order, wherein the digital resume includes at least one resume aspiration, and wherein the digital job order includes at least one job order aspiration, in order to achieve a high level of expected satisfaction between the submitter of the digital resume and the submitter of the digital job order upon consummation of a transaction based on the matching of the resume with the job order. A digital resume which includes at least one resume aspiration is received. A digital job order which includes at least one job order aspiration is received. The resume aspiration is compared to the job order aspiration. An aspiration match value is calculated on the basis of the comparison of the at least one resume aspiration to the at least one job order aspiration, wherein the aspiration match value is calculated to correlate highly with expected satisfaction of the submitter of the resume and the submitter of the job order subsequent to post-comparison consummation of a transaction based upon the match.

Additionally, the present disclosure provides a graphical reporting method for reporting feedback based on comparisons of time-based digital resumes and time-based digital job orders. At least one interim analytic factor is received. Each factor represents the result of comparison of a time-based digital resume and a time-based digital job order. A fill-color graphical report is displayed based on the interim analytic factors, wherein the report depicts each interim analytic factor as a graphical entity.

Other aspects, objectives and advantages of the invention will become more apparent from the remainder of the detailed description when taken in conjunction with the accompanying drawings.

The present invention provides a multi-dimensional time-based digital resume that effectively replaces the paper-based resume. It is based on the growing body of HR industry exchange standards, individually owned, and exchanged thru e-mail, diskettes, and Web sites just like other electronic documents.

Because "Everything Changes Over Time", the time-based digital resume matching criteria are time-based, which predispositions them to self-maintain their currency, and enables proactive matching with the simple progression of time. Both the employee and employer benefit from this feature.

Unlike a paper resume which limits expression of a candidate's robust professional background and their diverse career aspirations, the time-based digital resume accommodates an unlimited depth of background and aspiration data. The time-based digital resume graphical software viewer enables others to read the digital resume similar to other electronic documents. The Toolkit also enables the time-based and gradient weighting criteria input by the candidate, and enables the privacy and anonymity features.

Time-Based digital resumes are actively maintained within an on-site, private or the public exchange, continually matching up with time-based digital job orders in the exchange sending full-color graphical feedback reports to both the candidate and the employer. Because time-based digital resumes are time-based, each day can deliver entirely different analysis and relevance ranking reports, leading to an arbitrated candidate-employer match based solely on the progression of time.

The present invention further provides a time-based digital job order format that streamlines the human resources business process communications among employers, recruiters, and Web job boards. It is based on the growing body of human resource industry exchange standards, owned by the human resources professional, and exchanged thru e-mail, diskettes, and Web sites just like other electronic documents.

Because "Everything Changes Over Time", the time-based digital job order matching criteria are time-based in the same manner as the time-based digital resume, which predispositions them to self-maintain their currency, and enables proactive skills matching with the simple progression of time.

The known paper job orders limit the ability to detail the background skills required for the job, and also limits career aspirations to a few catch phrases like: "management potential", "career orientated", or "fast paced". The time-based digital job order accommodates an unlimited depth of background and aspiration data.

Time-Based digital job orders are actively maintained within an on-site, private or the public exchange, continually matching up with time-based digital resumes in the exchange sending full-color graphical feedback reports to both the employer and the candidate. Because time-based digital resumes are dependent on 'time', each day can deliver entirely different analysis and relevance ranking reports, leading to an arbitrated employer-candidate match based simply on the progression of time.

A time-based digital resume matches up with a time-based digital job order when an employer or agent submits a time-based digital job order into an on-site, private or the public exchange full of time-based digital resumes. Based on advanced data analytics, each time-based digital job order is matched and relevance ranked against each available time-based digital resume, and the results are delivered in full-color graphical feedback reports, for 360° feedback to both the employer and the candidate.

The design goal of the full-color graphical feedback reports is to bring cost savings to the employer by delivering valuable 'information' to the right recipient at the right time, so that appropriate career decisions can be made.

The present invention provides weighted "preference", "proficiency" and "importance" criteria defined to change over a defined period of time. When an employer creates a paper job order or a candidate creates a paper resume, the information is based on a single point in 'time', usually based on the situation as it is known to be "today", or "next month". Although situations may change dramatically over short periods of time, paper and ink simply do not accommodate such robust expressions of change.

When an employer authors a paper job order, they inflate their selection criteria knowing that they'll probably end up hiring a candidate who does not match all of their selection criteria. This is why so many unqualified candidates apply for positions believing that the employer may never find an 'exact match' for their job order, and may negotiate on a few selection criteria. When a candidate authors their resume, they also inflate their career aspirations and salary requirements, knowing that they will have to negotiate on a few selection criteria.

Figure 6:
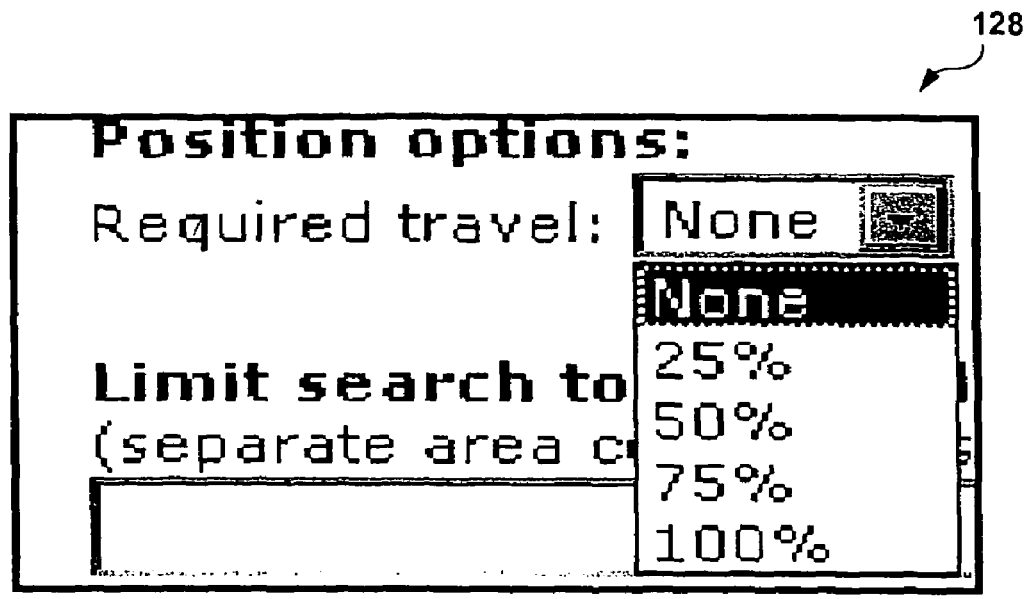
FIGS. 6 and 7 depict uses of matching criteria according to the present invention.
Figure 7:
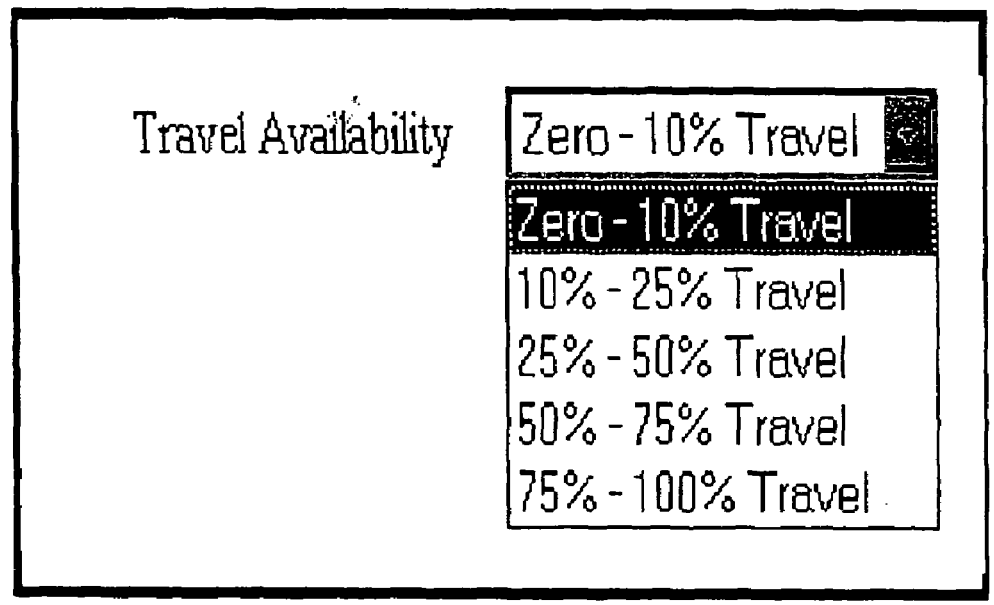

FIGS. 6 and 7 show non-time-based keyword fields 128, 130 for the skills matching criteria of 'travel', similar to what is seen in the known skills matching software. There is no allowance for this criteria to change over time, nor indication of whether the candidate prefers or could tolerate travel at this level. There is no indication as to 'how long' is this 'requirement' or 'preference' will be valid for? Three months? Three years? There is also no indication of weighting, to indicate whether this criteria is high or low on the employer or candidates list of needs.

"Because time really does matter", the software tools used to create both the time-based digital resumes and the time-based digital job orders are time-based, allowing for an expression of criteria to change over a period of time. The software tools enable the expression of "preference", "proficiency" and "importance" weighting for each selection criteria. Some matching criteria are absolute deal-killers, meaning they are non-negotiable. Other matching criteria are nice-to-haves, meaning that they are thrown into the resume as bargaining chips for negotiation. The following example shows how the progression of time effects time-based matching criteria, along with the candidate's "preference" for the criteria.

A junior consultant has been working at a big 5 consulting firm for several years now, traveling nearly 100% of the time. He is trying to balance his life-work scenario and is seeking local projects that require less than 50% travel. The consultant time-bases his "preference" for travel, rising from zero up thru 50% over an initial 30 days. Knowing that he must maintain a high utilization rate and cannot sit for 60 days 'on-the-bench', he extends his time-based "preference" for travel up from 50% thru 100% over the following 30 days. The junior consultant gradually increased his expectations for Travel from zero up to 100% over a 60 day period.

A partner in this same big 5 consulting firm has just signed a client contract and needs skills like those of the junior consultant. This partner prefers a consultant willing to travel 100% of the time, but might allow the work to be performed remotely with partial travel. He time-bases his "preference" for travel, decreasing from 100% down thru 50% over an initial 30 days when the project is scheduled to ramp-up. Knowing that the position cannot go unfilled for more than 60 days, he further extends the time-based "preference" for travel down from 50% thru zero over the following 30 days. The partner gradually reduces his expectations for travel from 100% down to zero over a 60 day period.

Figure 8:
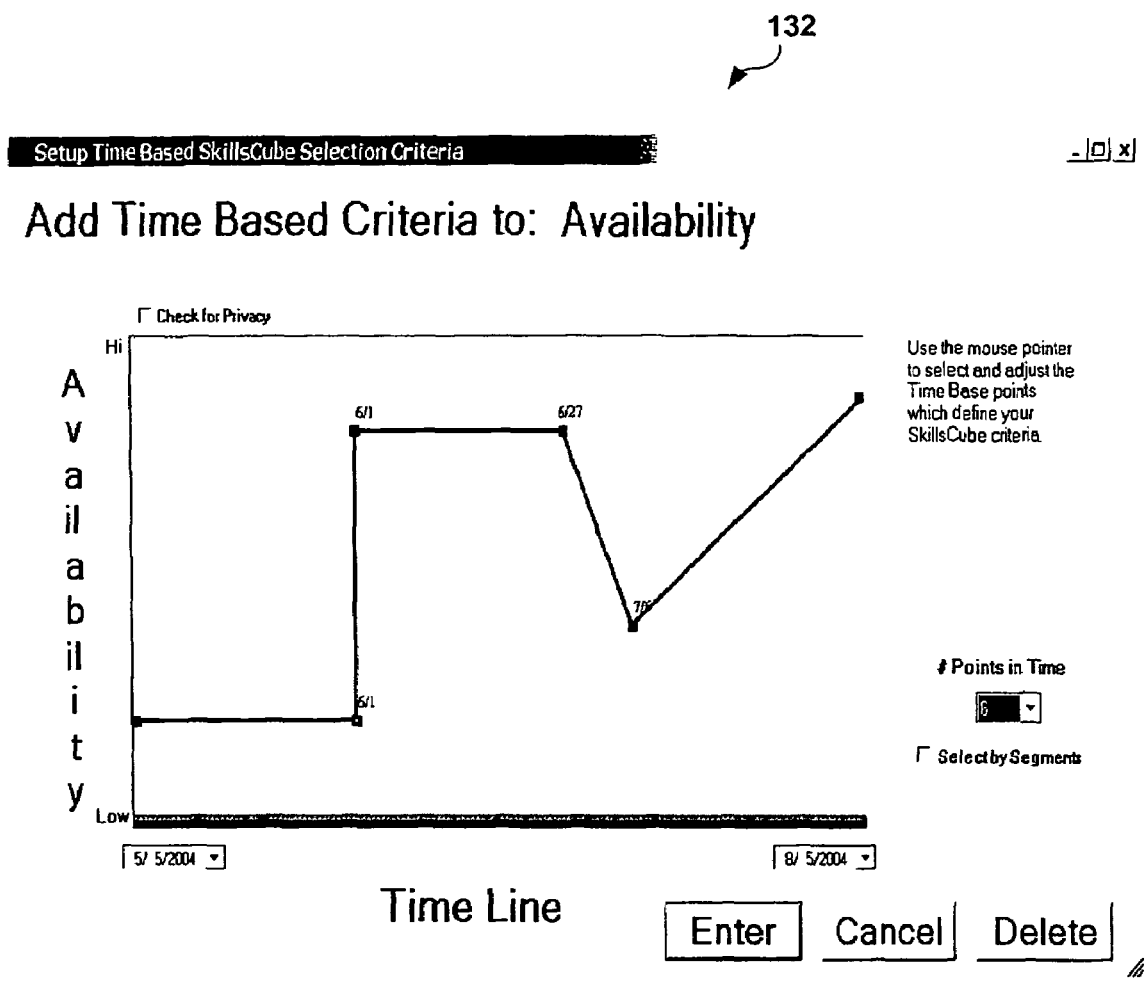
FIG. 8 presents a user interface for entering and maintaining time-based matching criteria over a given time line.

FIG. 8 presents a user interface 132 for entry of time-based data over a user defined period of time.

Figure 9:
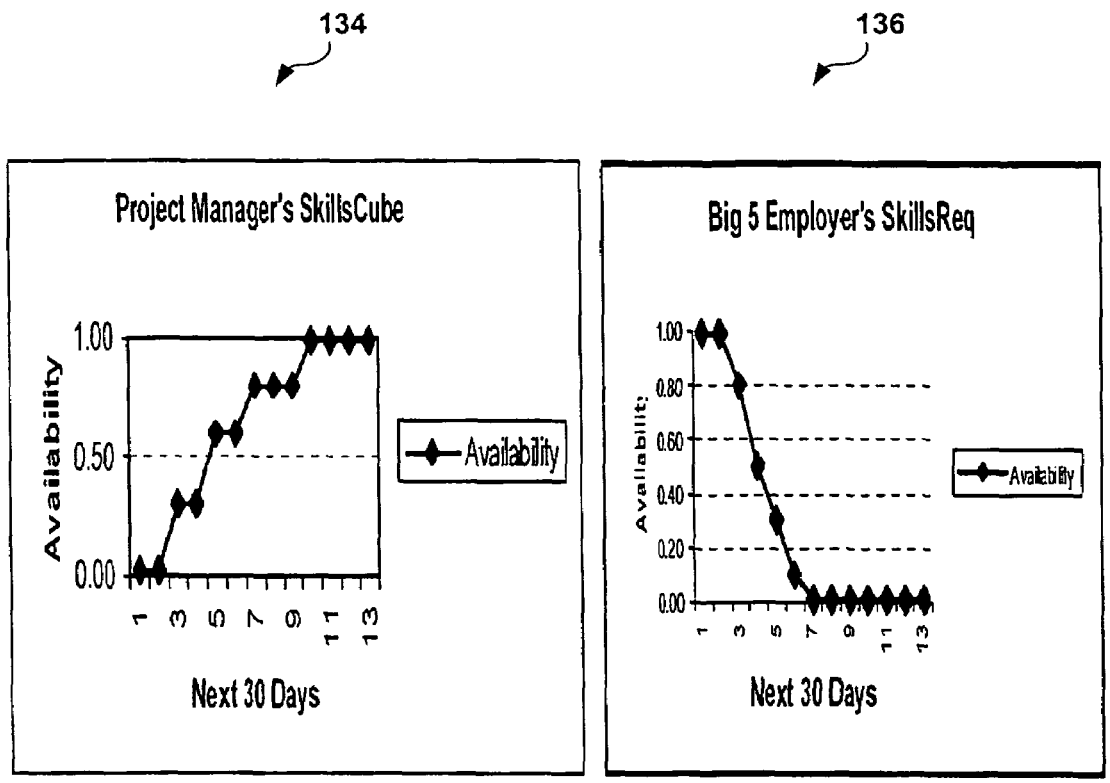
FIGS. 9 and 10 show the time-based matching of a digital resume to a digital job order.
Figure 10:
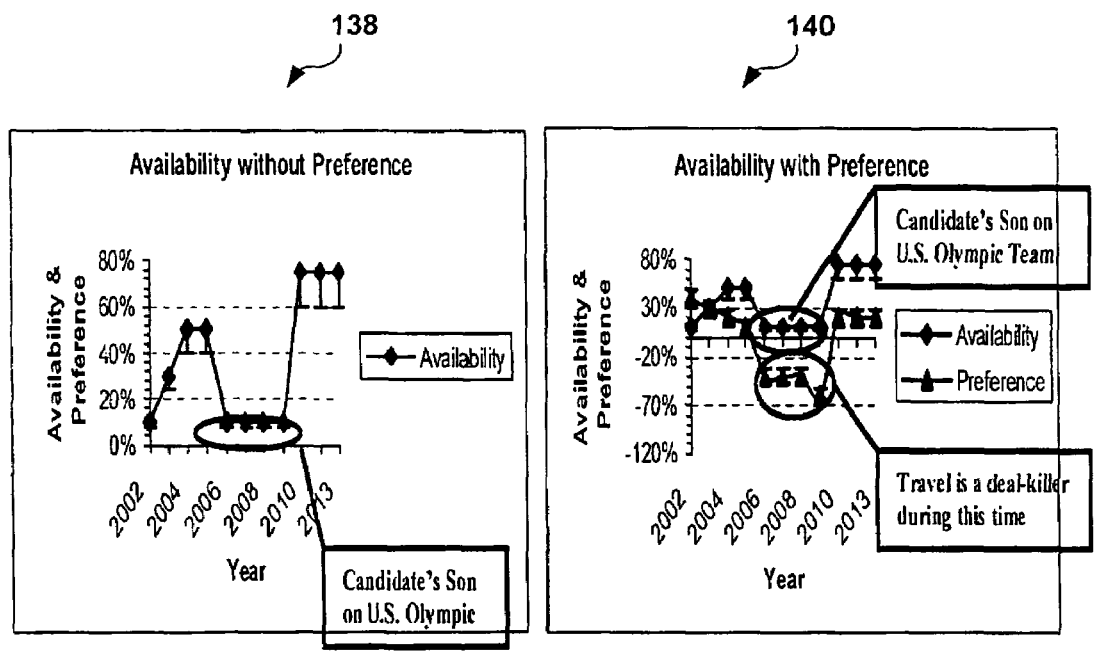

FIGS. 9 and 10 show the matching of a time-based digital resume to a time-based digital job order as graphical illustrations 134, 136, 138, and 140.

FIG. 11 provides a further time-based example 142 for the present invention. The time-based digital resumes software tools model the current human resources management industry's skills matching process, by establishing an infrastructure of anonymity for a candidate's personal information. When a candidate's digital resume shows up as a relevant match on an employer's digital job order report, the employer will not see the candidate's personal information.

The employer will have access through the time-based digital resumes on-site, private or the public exchange infrastructure to notify the matched candidate of their interest, and the candidate may then self-select whether to correspond with the potential employer.

Teamed digital resumes are similar in their function to time-based digital resumes, except that they represent a group of candidates who work together as a team, and therefore present themselves into the time-based digital resumes exchange as a 'team.' Candidates who work together on assignment as a team, can submit a teamed digital resume into an exchange to be matched and relevance ranked against available teamed digital job orders.

Figure 12:
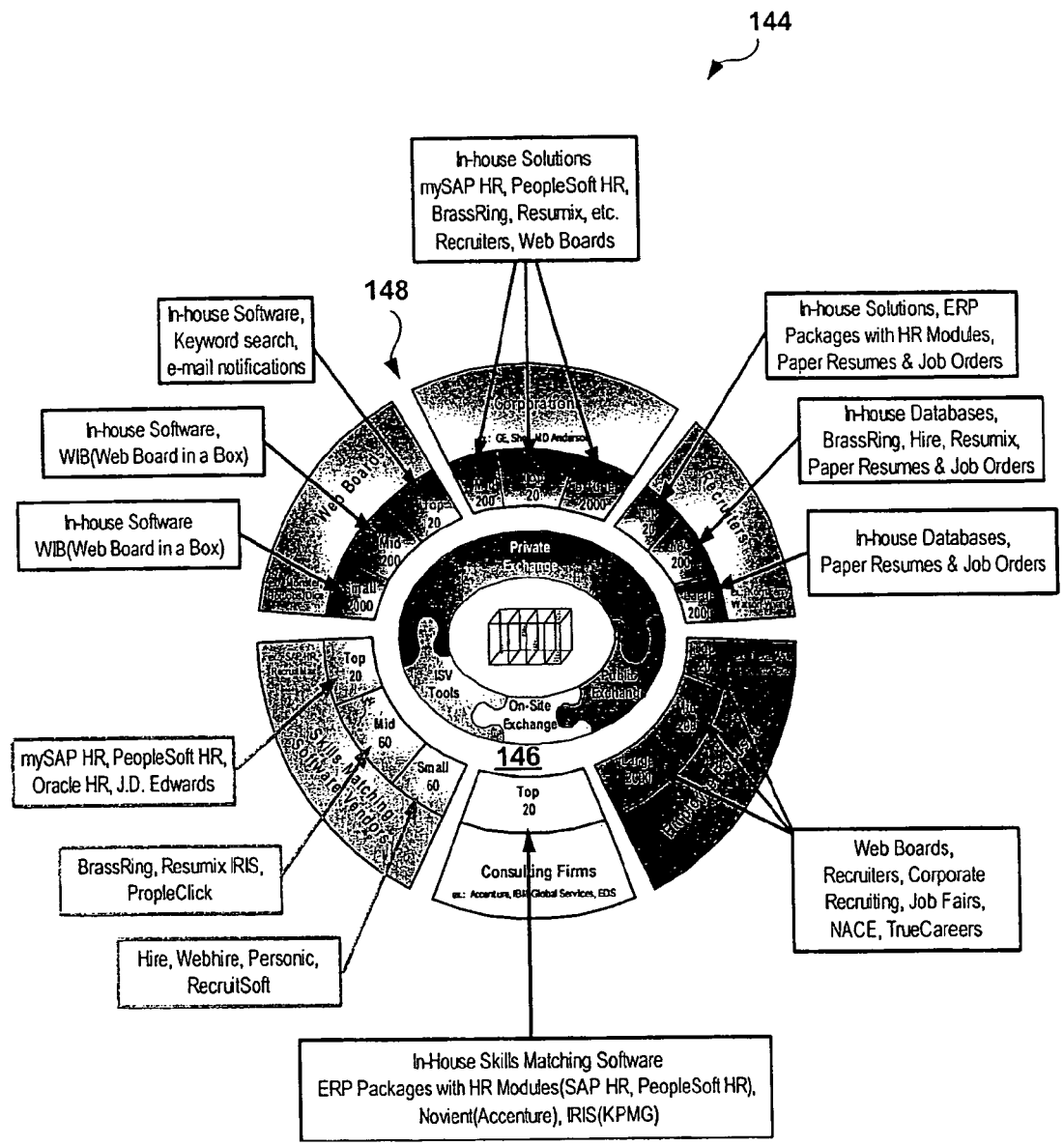
FIG. 12 presents exemplary fields of use for the present invention.

Employers benefit from the time-based digital job order of the present invention because the digital job order is based on the growing body of human resources management industry exchange standards. They are available for use within an on-site, private or the public exchange, or for distribution through agencies, recruiters and Web boards who participate in the talent matching process. In particular, FIG. 12 illustrates in some detail 144 the different market segments 148 to which the processes and component parts of the system 146 of the present invention pertain.

Because "Everything Changes Over time", the time-based digital job order criteria are based on time and self maintain themselves as time progresses, time-based digital job orders that are actively maintained within an on-site, private or the public exchange, continue to match up with active time-based digital resumes in the exchange, producing full-color graphical feedback reports to both the employer and the candidate. Because the time-based digital job order is based on time, each day can deliver entirely different analysis and relevance ranking reports, leading to an automated candidate-employer match somewhere in the middle of each set of needs, due to the effect of time's progression.

The time-based digital resume provides software tools that model the current human resources management industry's skills matching process by establishing an infrastructure of anonymity for a candidate's personal information. When an employer's time-based digital job order shows up as a relevant match on a candidate's time-based digital resume report, the candidate will not see the employer's personal information.

The candidate has access through the time-based digital resumes on-site, private or the public exchange infrastructure to notify the matched employer of their interest. The employer may then self-select whether to correspond with the potential candidate.

The time-based digital resume provides software tools that offer significant potential cost savings within organizations with large deployable and dynamic work forces, like consulting firms. When an internal consultant knows that their project is wrapping up, they self-maintain their own time-based digital resume and submit it into the employer's exchange for matching against all active time-based digital job orders. They can then prospect their time-based career aspirations against the employer's active time-based digital job orders. Using their full-color graphical feedback reports the candidate can then adjust their career aspirations to more closely match the needs of their employer.

The time-based digital resume also provides software tools for establishing an inter-agency hub which enables an employer to expand their time-based digital job order search beyond the limits of their on-site or private exchange. Employers can interlink their exchanges providing extended reach for their time-based digital job orders, and extended visibility for their time-based digital resumes. The time-based digital resumes public exchange is available to backfill any time-based digital job order needing to extend their reach beyond their own on-site, private or interlinked exchange.

The time-based digital job order of the present invention brings significant cost savings to organizations with large deployable and dynamic work forces, like consulting firms.

Teamed digital job orders are similar in their function to time-based digital job orders, except that they represent a job order for a group of candidates who work together as a team, rather than one single candidate. An employer can submit a teamed digital job order into their on-site or private exchange to be matched and relevance ranked against available teamed digital resumes.

Both the digital resume and the digital job order are based on the growing body of human resources management industry standards like the human resources management-XML Organization's SIDES (Staffing Industry Data exchange Standards) formats. The present invention incorporates standards for exchangeable digital resume data, to assure participants of interoperability, growth and scalability.

Time-based digital resumes have use in local and national colleges and Web job boards across the country. College students entering the job market with accomplished resumes, and varied career aspirations will e-mail their time-based digital resume along with the graphical software viewer. Agencies and recruiters will offer viewable time-based digital resumes in addition to text resumes on their candidates. Web job boards will display the time-based digital resumes logo, and will offer the toolkits for creating and maintaining both time-based digital resumes and time-based digital job orders.

Select corporations and consulting firms will purchase the time-based digital resumes private exchange solution, to provide time-based skills matching, for their large staff of in-house consultants. This type of solution increases both the utilization rate of their consultants, and the retention rate due to the career aspiration matching capabilities.

Figure 13:
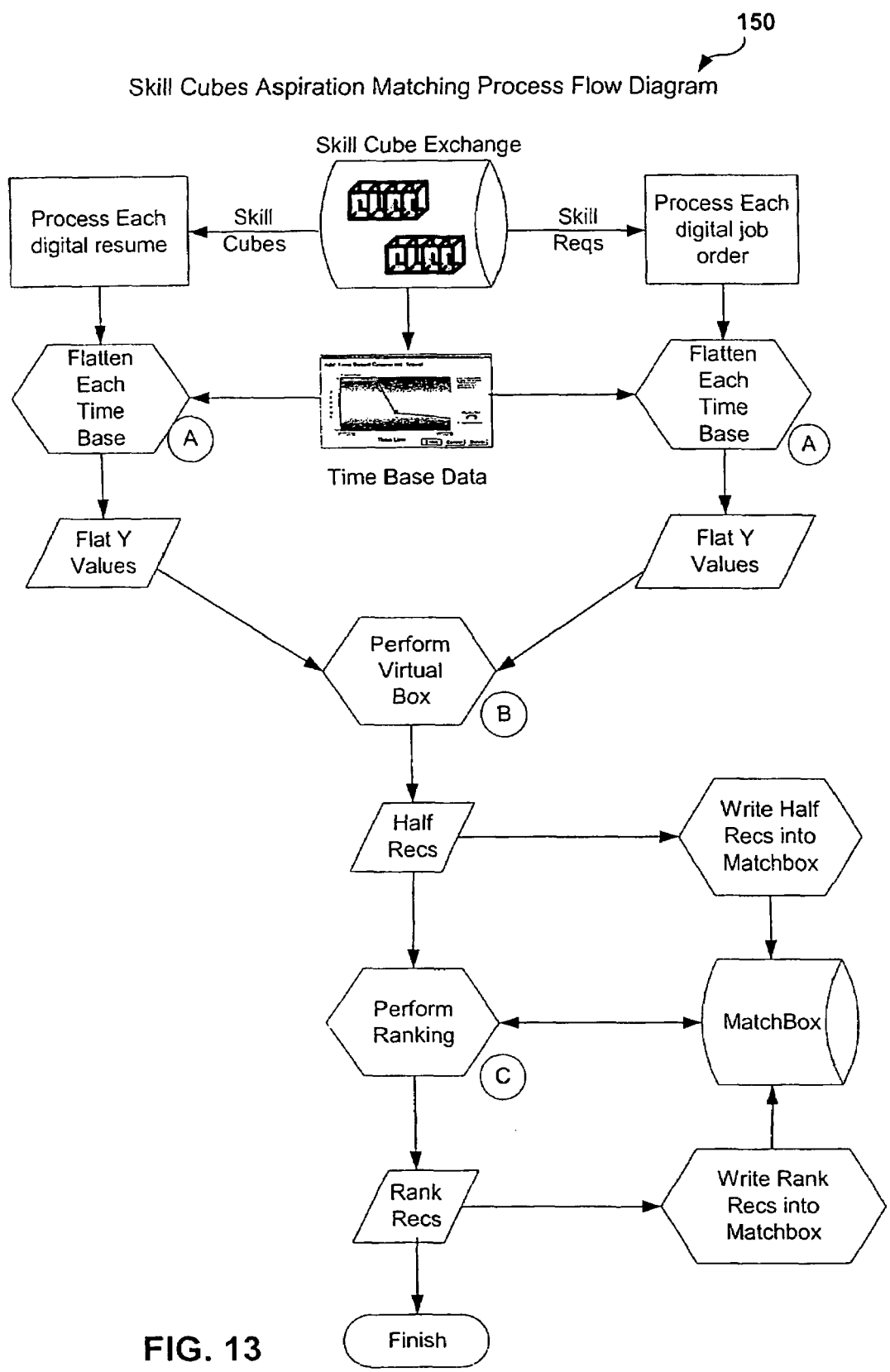
FIG. 13 provides one illustration of a flow diagram for performing the aspiration matching functions of the present invention.
Figure 14:
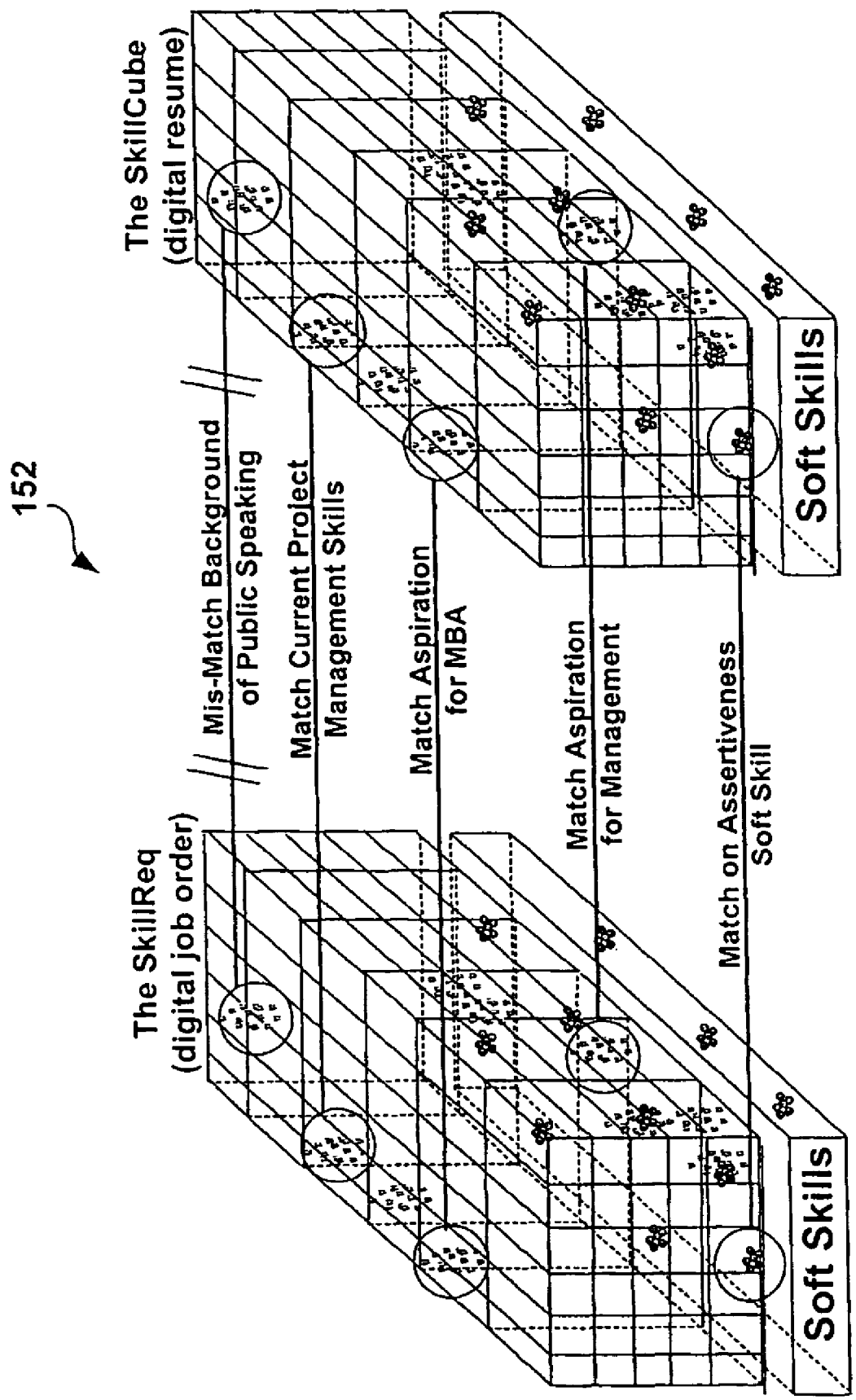
FIG. 14 shows the matching of digital resumes and digital job orders incorporating aligned aspirations.
Figure 15:
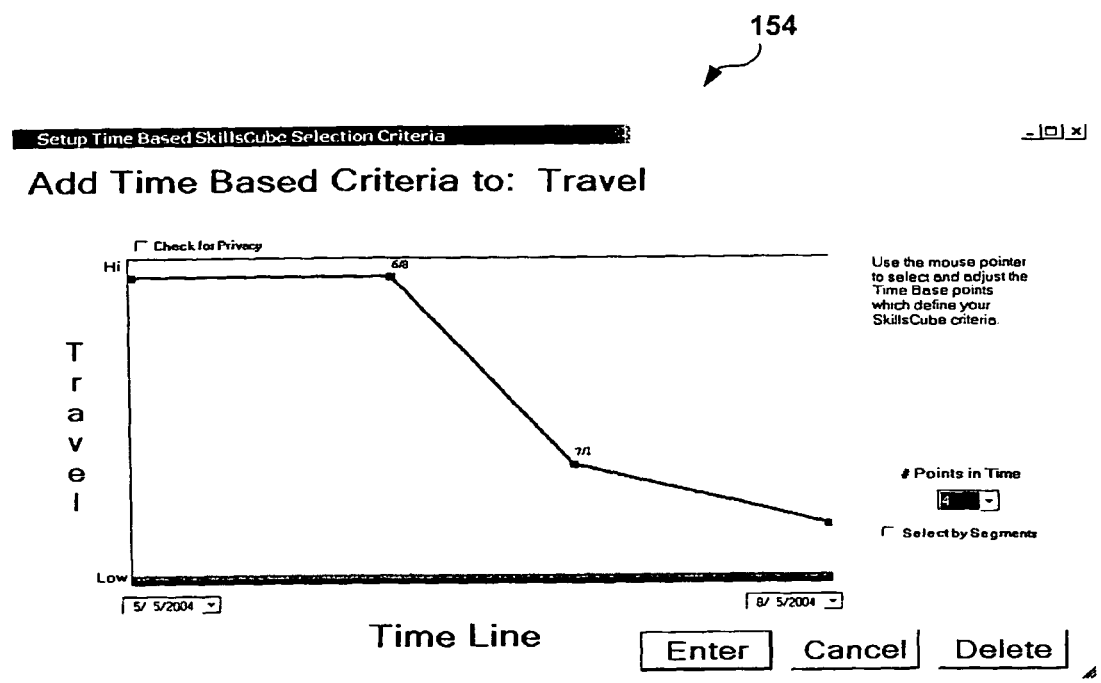
FIG. 15 depicts a user interface for time-based adjustment to a digital resume.

TIME-BASED DIGITAL RESUME ASPIRATION MATCHING PROCESS: The processes of skills matching available in the marketplace today are based on a user's input of discrete pieces of static selection criteria. FIG. 13 shows one example of a flow diagram 150 for performing the functions of the aspiration matching process of the present invention. Examples of these discrete pieces of static selection criteria include salary and travel requirements, and explicitly stated skill levels in pre-defined hard skills. These discrete pieces of static selection criteria are required as input from both the candidate (the resume) and the employer (the job order) in order to perform a match between the two. These current processes of skills matching use their discrete pieces of static selection criteria to perform increasingly thorough data analytics, in pursuit of the most accurate match between the candidate (the resume) and the employer (the job order). These data analytics fall under categories like: keyword matching, data analytics, artificial intelligence, and learning algorithms. FIG. 14 shows the matching 152 of digital resumes and digital job orders incorporating aligned aspirations. FIG. 15 depicts a user interface 154 for time-based adjustment to a digital resume.

The time-based digital resume aspiration matching process of skills matching differentiates itself from other skills matching processes currently in use, by A) using dynamic time-based selection criteria as input, and by B) using career aspirations data rather than background data as input, and C) by producing full-color graphical feedback reports as outputs to inform the user of the analytical results of the aspiration matching process, and D) by enabling user control over the accuracy of the skills matching algorithms, and E) enabling user control over the urgency of the skills matching, and by F) enabling user control over the degree to which skills matching is based on aspirations over background selection criteria Time-based aspirations data is explicitly input from the user in association with a calendar period of time, resulting in dynamically changing skills matching selection criteria. These time-based aspirations selection criteria are input by both the candidate (the time-based digital resume) and the employer (the time-based digital job order), and made available to the time-based digital resume aspirations matching process, where they are manipulated by the flatten process, the virtual box process, the backfill process, the ranking process, and stored into the matchbox process.

Figure 16:
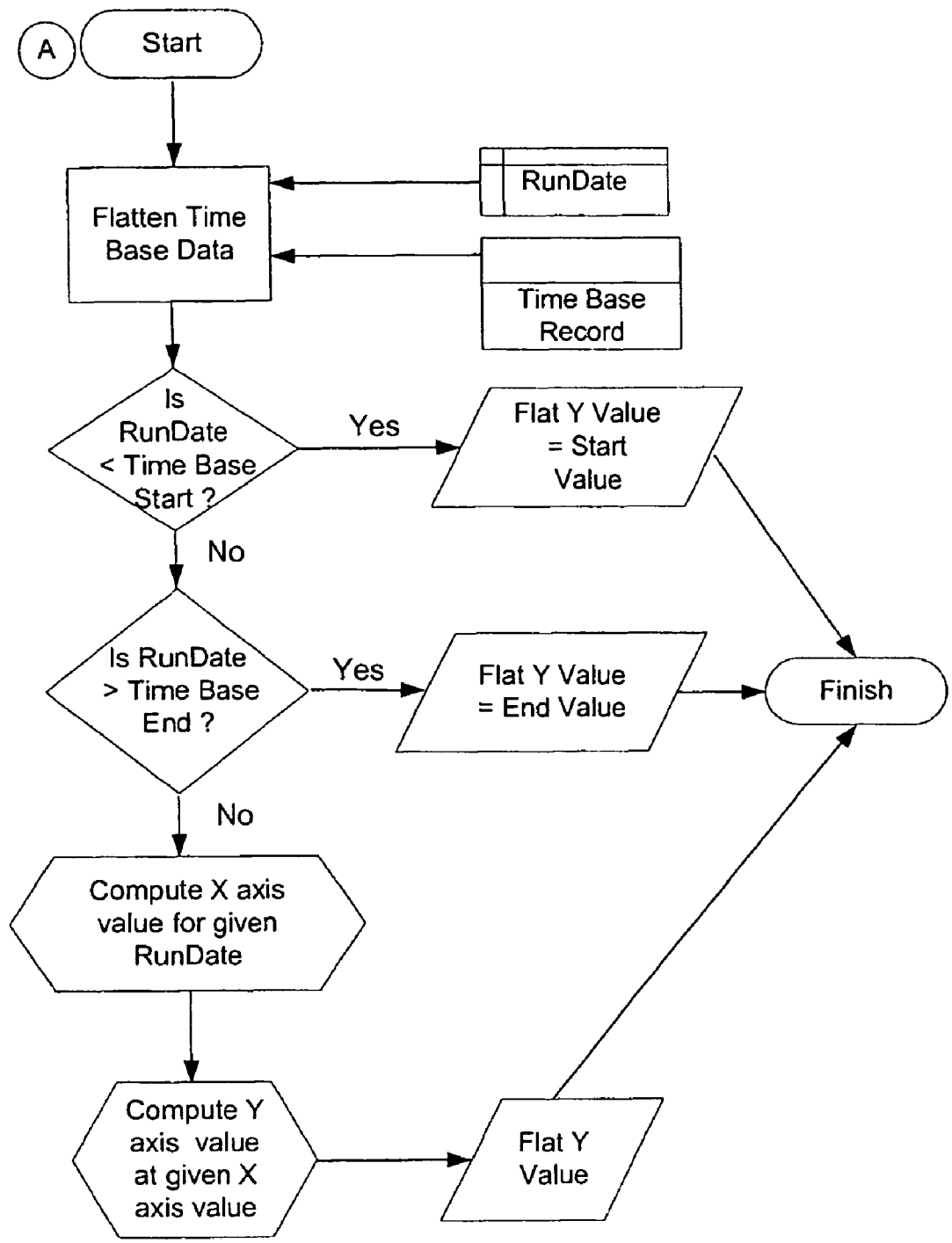
FIG. 16 provides a flow diagram for the flatten steps of the present invention.
Figure 17:
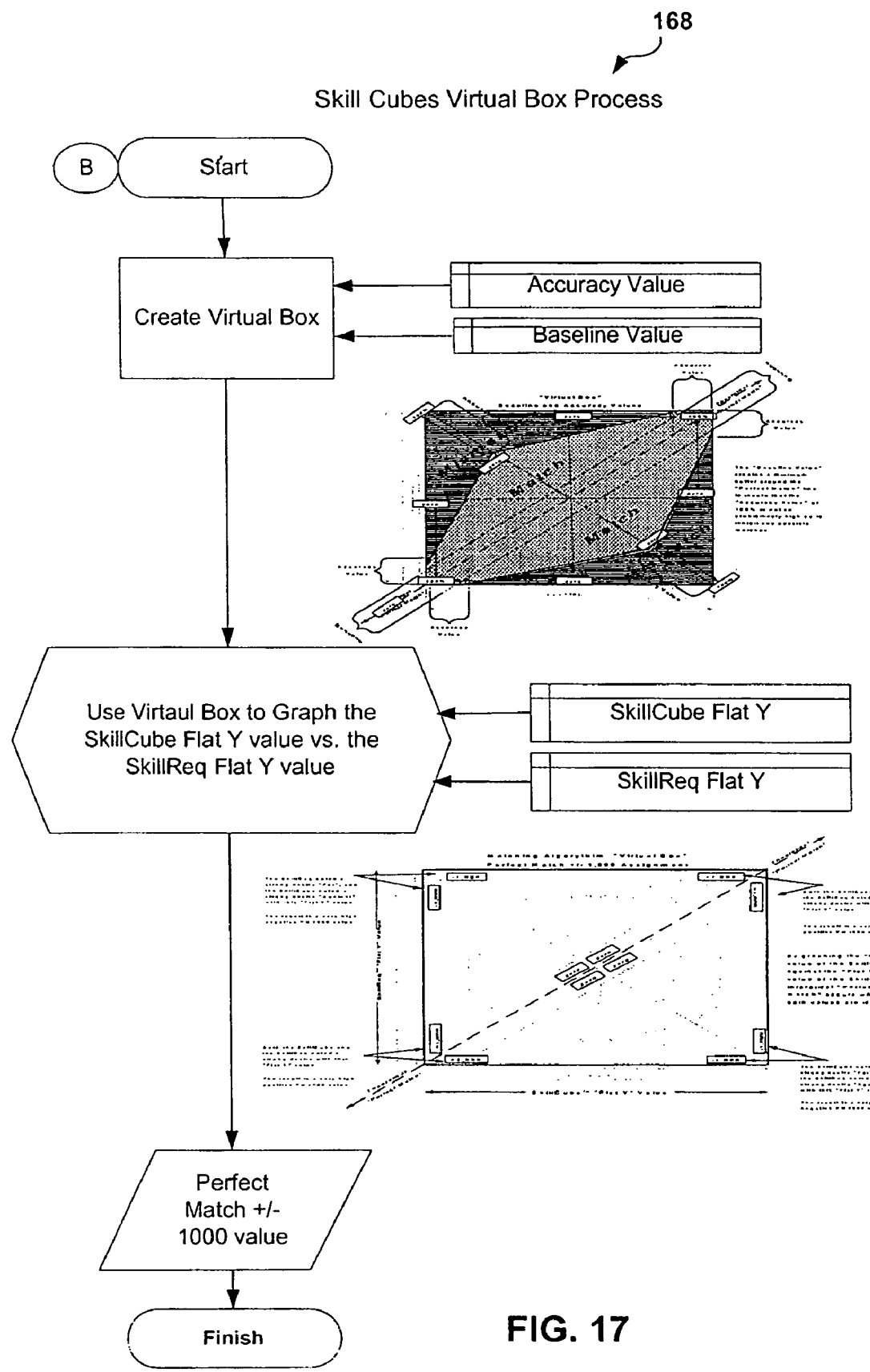
FIG. 17 provides a flow diagram for the virtual box process of the present invention.
Figure 18:
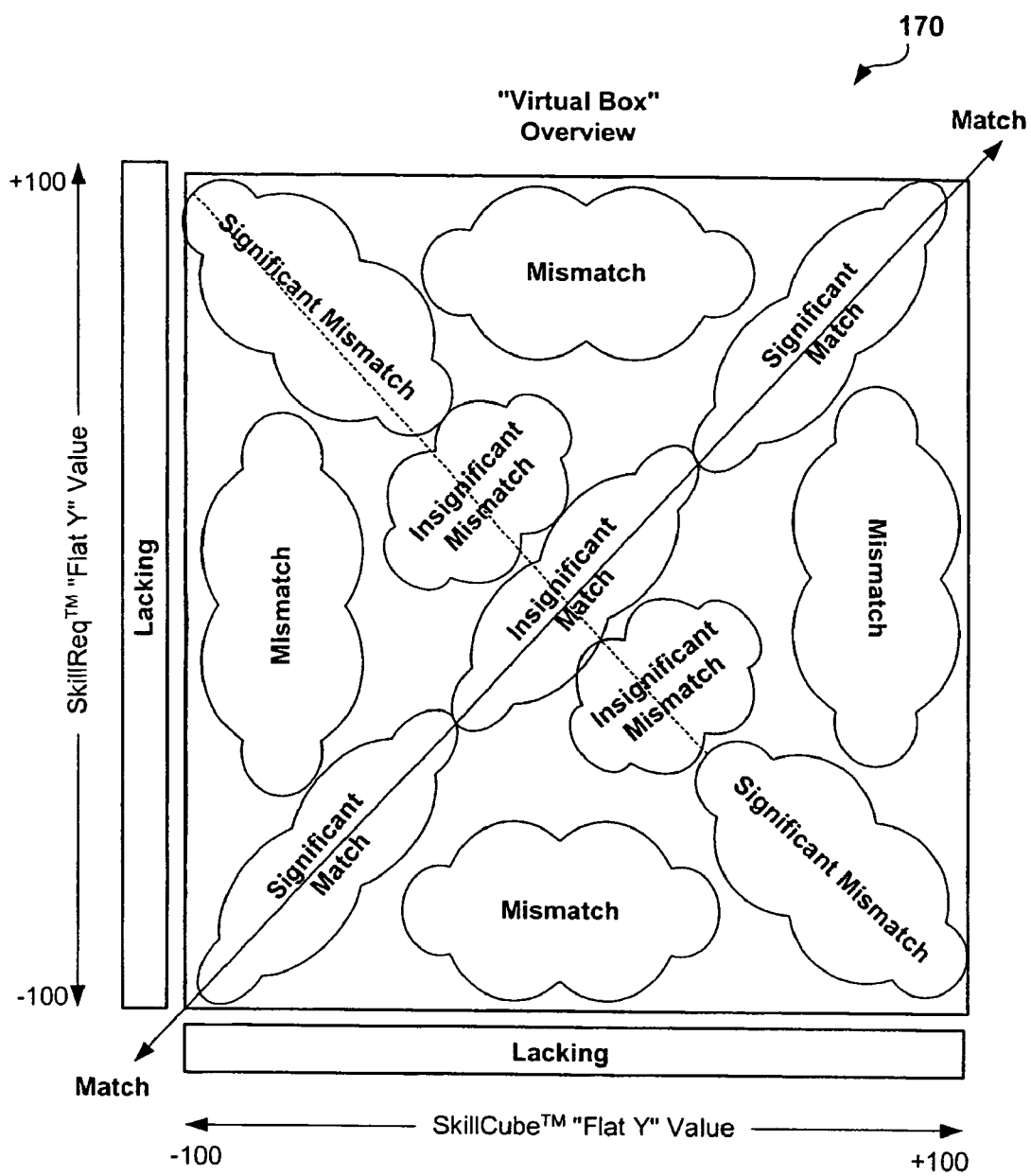
FIGS. 18 through 21 show mathematical theory concepts relating to the virtual box process associated with the aspiration matching functions of the present invention.
Figure 19:
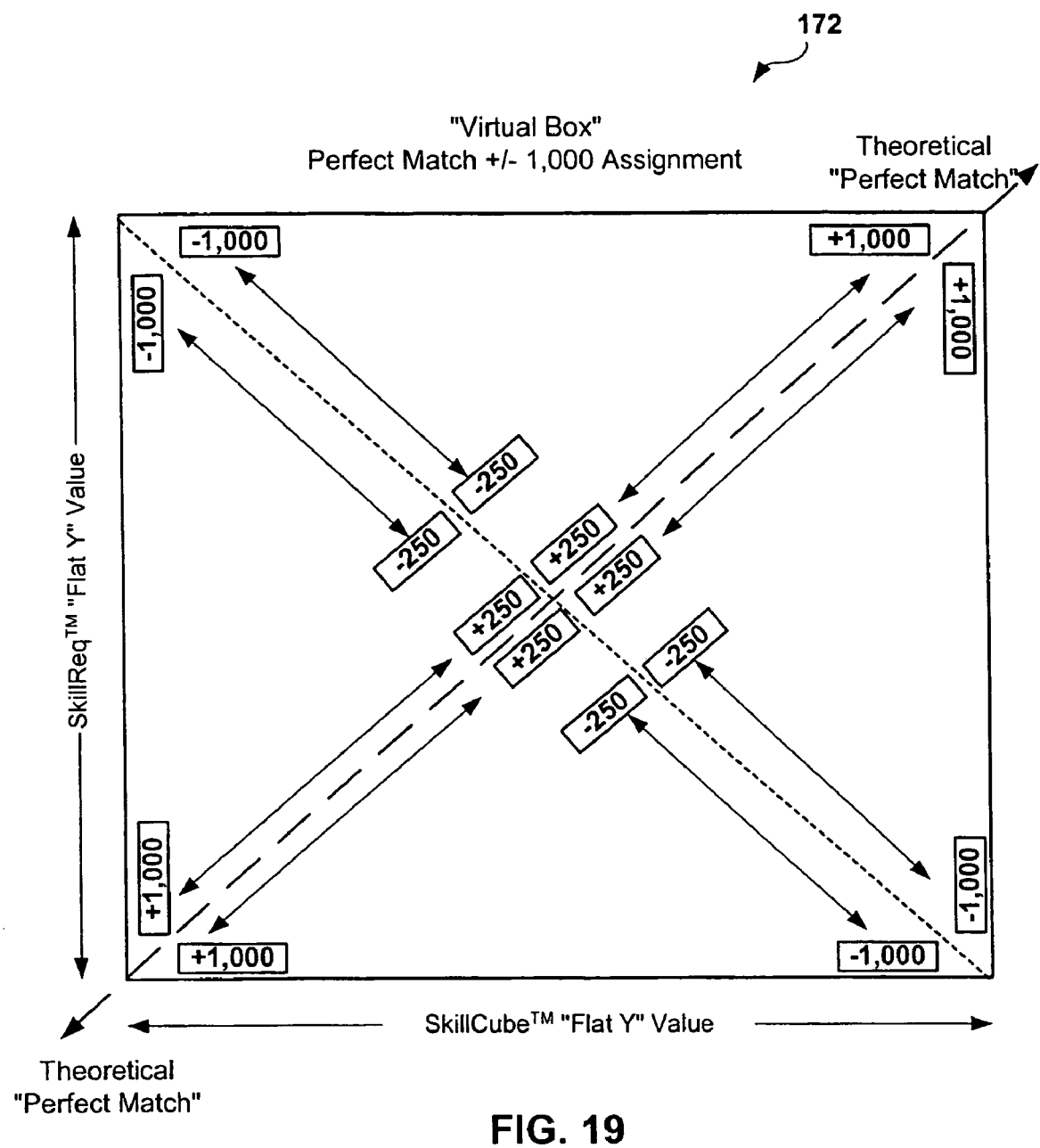
Figure 20:
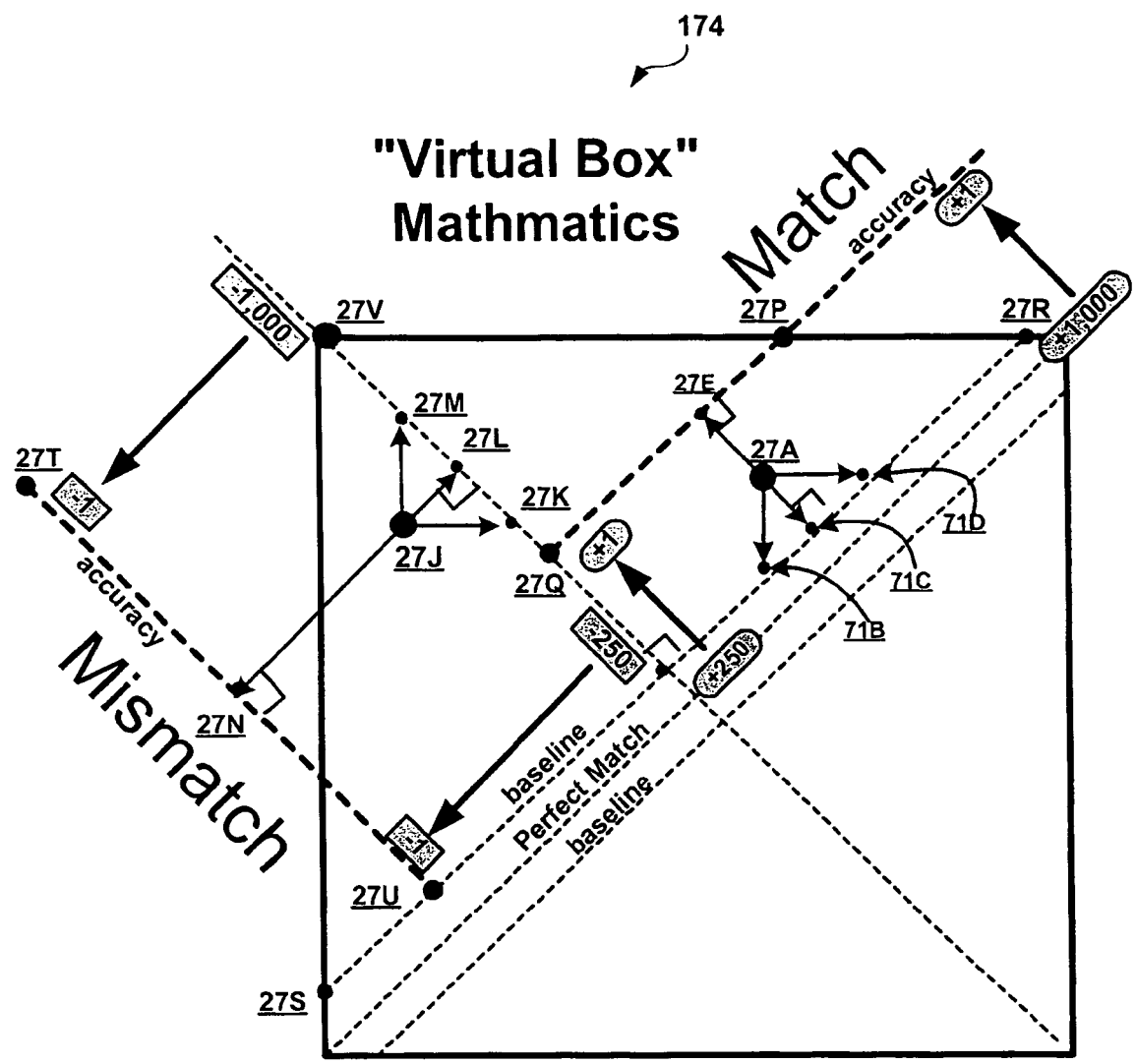
Figure 21:
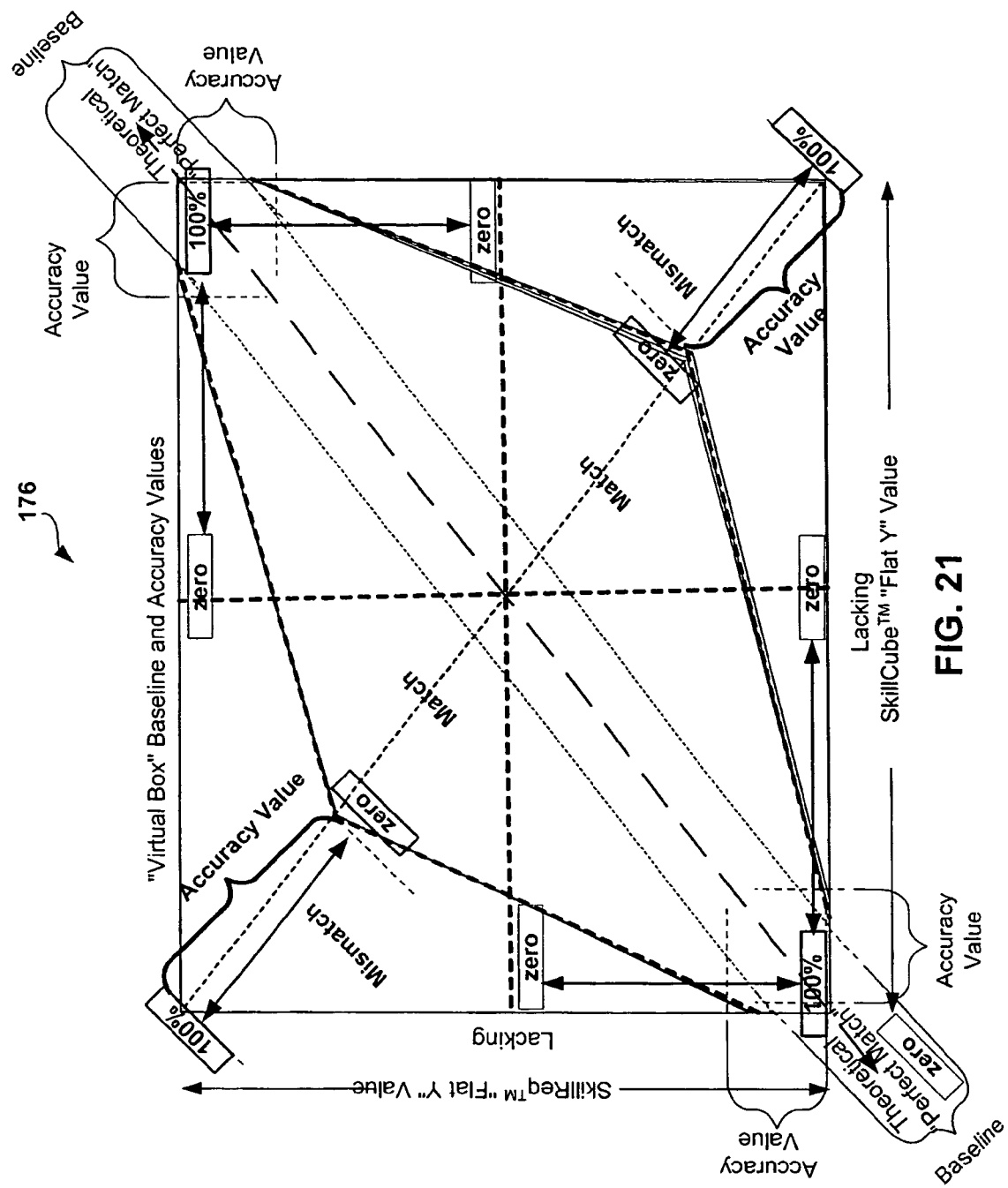
Figure 22:
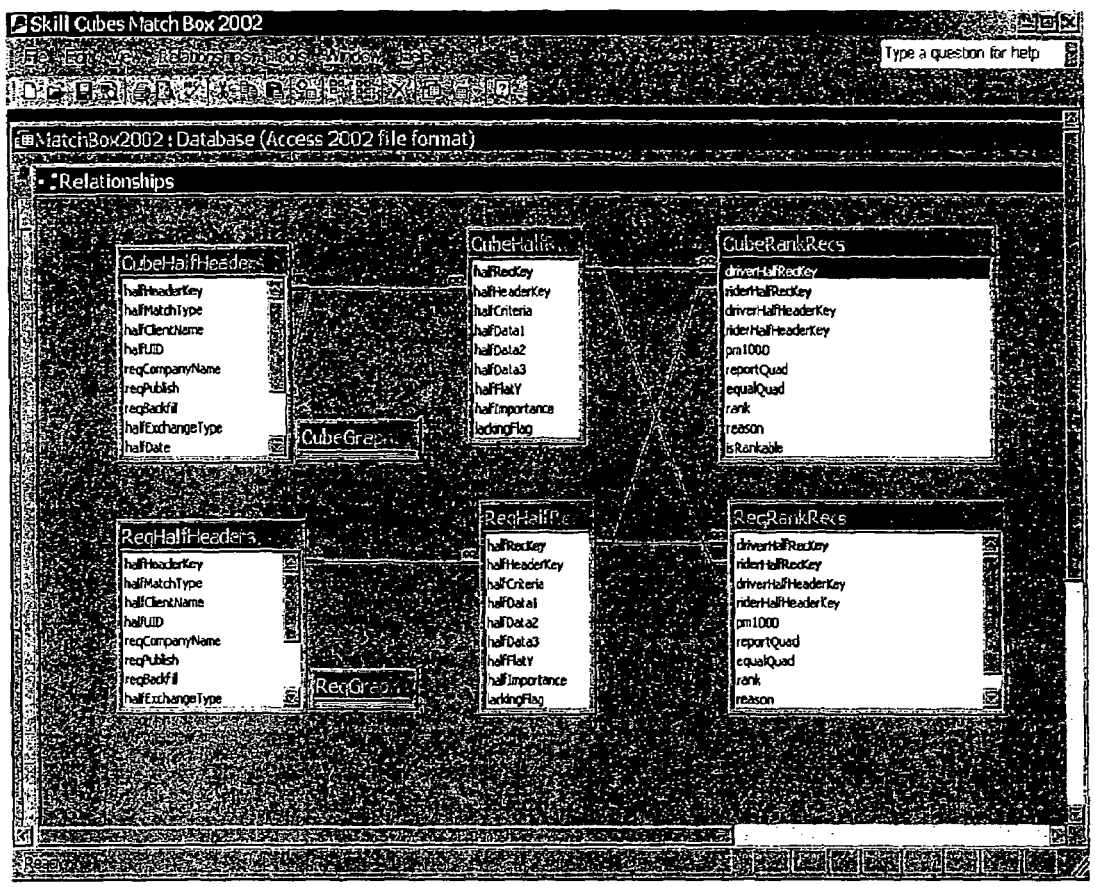

The time-based digital resume aspirations matching process described herein covers the flatten process, the virtual box process, the backfill process, the ranking process, and the matchbox process. FIG. 16 provides a flow diagram 156 for the flatten process. Table 1 depict the concepts and instructions for performing the various steps and associated functions of the flatten process.

TABLE 1

```
private int flatten_Cube_TimeBase( Cube.TimeBaseDataTable tbT, string skUID, string tbType )
{return ( flatten_Cube_TimeBase( tbT, skUID, tbType, "", "", "" )); }
private int flatten_Cube_TimeBase( Cube.TimeBaseDataTable tbT, string skUID, string tbType,
        string id1, string id2, string id3 )
{
///=================================================================================
/// Purpose: Translate a set of TimeBase Points over a given time span,
///     into a singular Y value representative of the Yvalue on the
///             given runDate of this Matching Engine execution.
/// Function:
/// Status:
///    Future:
///=================================================================================
    Point[ ] myPoints = new Point[10];
    Cube.TimeBaseRow tbRow = tbT.FindByskUIDtbTypeid1id2id3( skUID, tbType, id1, id2, id3 );
    if ( tbRow == null)
    {
        dbError dbe = new dbError( );
        dbe.text1Label.Text = "in flatten_Cube_timebase( ) – tbRow is null ";
        dbe.text2Label.Text = "skUID: "+skUID;
        dbe.text3Label.Text = "Plus: id1("+id1+"), id2("+id2+"), id3("+id3+"), tbType("+tbType+")";
        dbe.ShowDialog( );
        dbe.Dispose( );
        return ( );
    }
    // ==============================
    // if runDate is before/after the TB span, then return the Y0/Y9 value and we're thru
    // ==============================
```

TABLE 1-continued

```
        if ( runDate <= tbRow.startDate )
            return tbRow.Y0;
        else if( runDate >= tbRow.endDate )
            return tbRow.Y9;
    // ==================================
    // so we're within the TBspan(not befor X0, or after X9. find the appropriate segment,
    // and calculate the Yvalue
    // ==================================
        myPoints[0].X      = tbRow.X0;
        myPoints[1].X      = tbRow.X1;
        myPoints[2].X      = tbRow.X2;
        myPoints[3].X      = tbRow.X3;
        myPoints[4].X      = tbRow.X4;
        myPoints[5].X      = tbRow.X5;
        myPoints[6].X      = tbRow.X6;
        myPoints[7].X      = tbRow.X7;
        myPoints[8].X      = tbRow.X8;
        myPoints[9].X      = tbRow.X9;
        myPoints[0].Y      = tbRow.Y0;
        myPoints[1].Y      = tbRow.Y1;
        myPoints[2].Y      = tbRow.Y2;
        myPoints[3].Y      = tbRow.Y3;
        myPoints[4].Y      = thRow.Y4;
        myPoints[5].Y      = tbRow.Y5;
        myPoints[6].Y      = tbRow.Y6;
        myPoints[7].Y      = tbRow.Y7;
        myPoints[8].Y      = thRow.Y8;
        myPoints[9].Y      = tbRow.Y9;
        return ( flatten( myPoints, tbRow.numPoints, tbRow.startDate, tbRow.endDate ) );
}
private int flatten_Req_TimeBase( Req.ReqTimeBaseDataTable tbT, string companyName, string skrUID, string
tbType )
        {return ( flatten_Req_TimeBase( tbT, companyName, skrUID, tbType, "", "", "" )); }
private int flatten_Req_TimeBase( Req.ReqTimeBaseDataTable tbT, string companyName, string skrUID,
string tbType, string id1, string id2, string id3 )
        {
///=================================================================================
/// Purpose: Translate a set of TimeBase Points over a given time span,
///     into a singular Y value representative of the Yvalue on the
///     given runDate of this Matching Engine execution.
/// Function:
/// Status:
/// Future:
///=================================================================================
        Point[ ] myPoints = new Point[10];
        Req.ReqTimeBaseRow tbRow = tbT.FindBycompanyNameskrUIDtbTypeid1id2id3( companyName, skrUID,
tbType, id1, id2, id3 );
        if ( tbRow == null)
        {
            dbError dbe = new dbError( );
            dbe.text1Label.Text = "in flatten_req_timebase( ) – tbRow is null";
            dbe.text2Label.Text = "Company Name: "+companyName;
            dbe.text3Label.Text = "skrUID: "+skrUID;
            dbe.text4Label.Text = "Plus: "+id1+", "+id2+", "+id3+", "+tbType;
            dbe.ShowDialog( );
            dbe.Dispose( );
            return ( );
        }
    //==================================================
    //if runDate is before/after the TB span, then return the Y0/Y9 value and we're thru
    //==================================================
        if ( runDate <= tbRow.startDate )
            return tbRow.Y0;
        else if( runDate >= tbRow.endDate )
            return tbRow.Y9;
    //==================================================
    // so we're within the TBspan(not befor X0, or after X9.
    // find the appropriate segment, and calculate the Yvalue
    //==================================================
        myPoints[0].X      = tbRow.X0;
        myPoints[1].X      = tbRow.X1;
        myPoints[2].X      = tbRow.X2;
        myPoints[3].X      = tbRow.X3;
        myPoints[4].X      = tbRow.X4;
        myPoints[5].X      = tbRow.X5;
        myPoints[6].X      = tbRow.X6;
        myPoints[7].X      = tbRow.X7;
```

TABLE 1-continued

```
            myPoints[8].X  = tbRow.X8;
            myPoints[9].X  = tbRow.X9;
            myPoints[0].Y  = tbRow.Y0;
            myPoints[1].Y  = tbRow.Y1;
            myPoints[2].Y  = tbRow.Y2;
            myPoints[3].Y  = tbRow.Y3;
            myPoints[4].Y  = tbRow.Y4;
            myPoints[5].Y  = tbRow.Y5;
            myPoints[6].Y  = tbRow.Y6;
            myPoints[7].Y  = tbRow.Y7;
            myPoints[8].Y  = tbRow.Y8;
            myPoints[9].Y  = tbRow.Y9;
            return ( flatten( myPoints, tbRow.numPoints, tbRow.startDate, tbRow.endDate ) );
            }
private int flatten( Point[ ] myPoints, int numPoints, DateTime startDate, DateTime endDate )
            {
///=================================================================
/// Purpose: Translate a set of TimeBase Points over a given time span,
///     into a singular Y value representative of the Yvalue on the
///     given runDate of this Matching Engine execution.
/// Function:
/// Status:
///    Future:
///=================================================================
float flatY;
float flatX;
float segmentrunPercent;
float segmentrise;
float runX;
float riseY;
long tbTicks;
long runDateTicks;
// determine # of ticks between tbRow.end and tbRow.start
// determine where before/middle/end of start-end spread, that the runDate falls
// grab those two tbPoints(left & right), build a rise/run box, reconcile rise to get flatY value
tbTicks      = endDate.Date.Ticks – startDate.Date.Ticks;
runDateTicks = runDate.Date.Ticks – startDate.Date.Ticks;
flatX        = (runDateTicks* TB_LENGTH/*100 or 1000*/) / tbTicks;
//==============================
// identify the TB segment which bounds the given runDate
// use the flatX to geometrically slice the virtual box of the TB segment
//==============================
int i;
for (i = 1; i< numPoints; i++)
    if( myPoints[i].X >= flatX ) break; // loop to find the appropriate TB segment
/// pseudo code
//since we're here, there's a point[i] on our right, and a point on our left[i-1]
//calculate the runx as the run distance between the leftX and rightX
//calculate the riseY as the rise distance between the leftY and rightY
//calculate the segmentrunPercent(how far into the runX is the flatX?)
//then apply the segmentrunPercent(as a geometirc equivilant %(rise%=run%) )to the riseY giving
segmentrise
//Giving: the flatY as the leftY plus the riseY :-) Whew !
     runX              = myPoints[i].X – myPoints[i-1].X;
riseY        = myPoints[i].Y – myPoints[i-1].Y;
segmentrunPercent     = (flatX – myPoints[i-1].X)/runX;
//bug segmentrunPercent = flatX/runX;
segmentrise  = riseY * segmentrunPercent;
flatY = myPoints[i-1].Y + segmentrise;
if( flatY > 100)
    flatY = 100;
else if (flatY < 0)
    flatY= 0;
    return (Convert.ToInt32( flatY ) );
} //end( )
```

The time-based digital resume aspirations matching process flows sequentially from the flatten process, through the virtual box process, into the backfill process, into the matchbox process, and finally into the ranking process. FIGS. 17 through 21 and Tables 2-7 relate to the virtual box process of the present invention. Whereas FIGS. 22 through 25 address the matchbox process. Concepts and instructions relating to one embodiment of the ranking process of the present invention appear in Tables 8 and 9. These five processes reduce the time-based aspirations skills matching selection criteria into static selection criteria, then relate the static selection criteria of the time-based digital resume to those of the time-based digital job order, then backfill time-based digital resumes from other exchanges into a single exchange, then provide retention for the results, and then assign priority rankings to the matching relationship.

TABLE 2

```
private void build_virtual_box( int accuracy )
        {
    /// ====================================================== 
    /// Purpose: Update two points of the Virtual Box, based on a given Accuracy value
    /// Function: See jkohs notes for technical details on this function.
    ///    These two points symbolically represent all eight points of the
    ///    four Accuracy segment lines. But due to Reflection of the
    ///    quadrants, only these two are physically necessary to calculate.
    /// Status:
    ///Future:    could preset some of this math, rather than re-re-re executing it for eh Driver
    ///    could draw a jpeg of this cube and stuff it into the Cube/Req for later display?
    ///History: -- -- -- jkohs initail coding
```

TABLE 2-continued

```
    ///    12-29-03 jkohs implemented V2 of the Virtual Box
    ///
    /// ======================================================
    double diag = Math.Sqrt( (TB_LENGTH*TB_LENGTH)/2);
    double indent = diag * (1-VB_PRACTICAL_BASE);
    double workableDiag = diag – indent;
    double miniDiag;
    double miniXY;
    miniDiag = (accuracy * workableDiag) / 100;
    miniXY = Math.Sqrt( (miniDiag*miniDiag)/2);
    ulAPoint.X = Convert.ToInt32( miniXY );
    ulAPoint.Y = Convert.ToInt32( TB_LENGTH – miniXY );
    urAPoint.X = Convert.ToInt32( (TB_LENGTH/2) + miniXY );
    urAPoint.Y = Convert.ToInt32( (TB_LENGTH*1.5) – miniXY );
```

TABLE 3

```
private int do_Virtual_Box( int driverFlatY, int riderFlatY )
    {
    ///======================================================         /// Purpose: Graph X vs. Y
values into the Virtual Box to derive Perfect Match 1000(PM1000) values
    /// Function: Each of the three quadrant(pos M, neg M, MM) logics differ . . .
    /// Station:
    ///Future:
    ///History: -- -- -- jkohs initial coding
    ///    12-29-03 jkohs changes for V2 of Virtual Box w/reflection
    /// ======================================================         int ppm 1000;
    float shorterSegment;
    float longerSegment;
    Point reflectedP = new Point( );
    //================================
    // reflect the X-Y pair through mirroring, into the upper-center two triangles of the VB
    //================================
    reflectedP = reflect_point( driverFlatY, riderFlatY );
    //================================
    // Now we KNOW that the XY pair is in the upper-middle two diagonals of the VB
    // Run the VB Mathmatics to assign a PM1000 value to this XY pair
    //=========================
    if ( is_this_point_below_segment( reflectedP.X, reflectedP.Y, ulAPoint, urAPoint ) )
        {
        ///calc LRM & ULM with:
        ///calc LRM 250-1000 as A0
        ///calc len MP-LRM as A1
        ///calc len ULM-LRM as A2
        ///calc PM1000 as:
        ///            250–(A1/A2*250)
        Point lrmP   = new Point( );
        Point lrmP1  = new Point( );
        Point lrmP2  = new Point( );
        Point ulmP   = new Point( );
        Point ulmP1  = new Point( );
        Point ulmP2  = new Point( );
        int         lrm;
        int ulm;
        lrmP1.X = lrmP1.Y = ulmP2.X = reflectedP.X;
        lrmP2.X = lrmP2.Y = ulmP1.Y = reflectedP.Y;
        ulmP1.X = ulAPoint.X + (ulmP1.Y-ulAPoint.Y); // equally as far right, as is far up
        ulmP2.Y = ulAPoint.Y + (ulmP2.X-ulAPointX); // equally as far up, as is far right
        // lrm's X-Y coords are found mid-way between lrm1's & lrm2's X-Y coords
        // urm's X-Y coords are found mid-way bewteen urm1's & urm2's X-Y coords
        lrmP.X = ( lrmP2.X – lrmP1.X )/2 + lrmP1.X;
        lrmP.Y = ( lrmP2.Y – lrmP1.Y )/2 + lrmP1.Y;
        ulmP.X = ( ulmP2.X – ulmP1.X )/2 + ulmP1.X;
        ulmP.Y = ( ulmP2.Y – ulmP1.Y )/2 + ulmP1.Y;
        //calculate distance bewteen Perfect Match line, and Accuracy(ones) line
        //then calculate distance of MisMatch Point as percentile between PMM & Accuracy lines
        shorterSegment  = (float) Math.Sqrt ( 2 * Math.Pow(ulmP.X-reflectedP.X), 2) );
        longerSegment   = (float) Math.Sqrt ( 2 * Math.Pow((ulmP.X-lrmP.X, 2         )        );
        //preset ulm value at ones line(==1), then calculate value of lrm between min-max
        ulm = 1; // preset as the 'Ones Line'. FUTURE: could vary
        lrm = ( ((( lrmP.X – cPoint.X ) * (VB_PRECISION – VB – PRECISION_MIN))/(TB_LENGTH/2) ) + VB_PRECISION_MIN;
        pm1000 = Convert.ToInt32(( shorterSegment * (lrm-ulm))/longerSegment);
        }
    else
    { // Mismatch
```

TABLE 3-continued

```
    /// calc ULM & LRMM
    /// calc len MMP-LRMM as B1
    /// cal len ULMM-LRMM as B2
    /// calc pm 1000 as:
    ///                            (-1)*(B1/B2*1000)
            Point lrmmP           = new Point( );
    Point lrmmP1    = new Point( );
    Point lrmmP2    = new Point( );
    Point ulmmP                   = new Point( );
    Point ulmmP1    = new Point( );
    Point ulmmP2    = new Point( );
    int             lrmm;
    int ulmm;
    lrmmP1.X = ulmmP2.X = reflectedP.X;
    lrmmP2.Y = ulmmP1.Y = reflectedP.Y;
    lrmmP1.Y = ulAPoint.Y + (lrmmP1.X – ulAPoint.X);
    lrmmP2.X = ulAPoint.X + (lrmmP2.Y – ulAPoint.Y);
    ulmmP1.X = ulPoint.X + (ulmmP1.Y – ulPoint.Y);
    ulmmP2.Y = ulPoint.Y + (ulmmP2.X – ulPoint.X);
    // lrmm's X-Y coords are found mid-way between lrmm1's & lrmm2's X-Y coords
    // urmm's X-Y coords are found mid-way between urmm1's & urmm2's X-Y coords
    lrmmP.X = ( lrmmP2.X – lrmmP1.X )/2 + lrmmP1.X;
    lrmmP.Y = ( lrmmP2.Y – lrmmP1.Y )/2 + lrmmP1.Y;
    ulmmP.X = ( ulmmP2.X – ulmmP1.X )/2 + ulmmP1.X;
    ulmmP.Y = ( ulmmP2.Y – ulmmP1.Y )/2 + ulmmP1.Y;
    //calculate distance between PerfectMismatch line, and Accuracy(ones) line
    //then calculate distance of MisMatch Point as percentile between PMM & Accuracy lines
    shorterSegment = (float)MathSqrt ( 2 * Math.Pow((ulmmP.X–reflecedP.X), 2) );
    longerSegment  = (float)Math.Sqrt ( 2 * Math.Pow((ulmmP.X–lrmmP.X), 2) );
    //preset ulmm value equal to –1000. FUTURE: could vary
    //preset lrmm value equal to –1. FUTURE: could vary
    //then calc pmm value between –1 & –1000 as same percentage of smaller segment vs. larger segment
    lrmm = –1; // preset as the 'Ones Line'
    ulmm = –1000; // preset as maximum PM1000 Mismatch
    if ( longerSegment == 0 || shorterSegment ==0 )
        pm1000 = –1;
    else
        pm1000 = ulmm – Convert.ToInt32( ( shorterSegment * (ulmm-lrmm) ) / longSegment );
    }
    return pm1000;
} //end( )
```

TABLE 4

```
private int do_Report_Quad( int driverFlatY, int riderFlatY )
{
/// =====================================================
/// Purpose: Geometrically assign the two flatY values to be a Match,
///          Mismatch or Lacking value
/// Function:
/// Status:
///Future:    smoosh these multi-lines into one firmly unreadable & tight
///           line of code for performance, as this is another choke point for
the Engine
///History: 01-21-2003 jkohs halved the code using greater/lesser and
///    an asymetric view of the VB
///also patched for variance between TB_Length(CubeKit uses 0-100),
and Virtual Box(0-1000)
///    12-30-2003 jkohs updated for new VB
/// =====================================================
//     REPORTQUAD_MATCH
//     REPORTQUAD_MISMATCH
//     REPORTQUAD_LACKING
//     REPORTQUAD_EQUALED
    Point reflectedP = new Point( );
    reflectedP = reflect_point (driverFlatY, riderFlatY);
    if ( is_this_point_below_segment( reflectedP.X, reflectedP.Y,
ulAPoint, urAPoint ) )
        return REPORTQUAD_MATCH;
    else
        return REPORTQUAD_MISMATCH;
} //end( )
```

TABLE 5

```
private bool is_this_point_below_segment( int anyX, int anyY, Point
leftPoint, Point rightPoint )
{
/// =============================================================
/// Purpose: Given a single Point, plus two points of a segment, determine
///    if the given point is above or below the segment
/// Function:
/// Status:   this code is plagerized from the flatten routine
////Future:   smoosh the code into a single unreadable line for speed(this
routine is a choke point)
///   History: 01-21-2003 jkohs patched algorythm
///
/// =============================================================
    double riseY;
    double runX;
    double flatX;
    double cross;
    riseY   = rightPoint.Y – leftPoint.Y;
    runX    = rightPoint.X – leftPoint.X;
    flatX   = anyX – leftPoint.X;
    cross   = leftPoint.Y + (riseY/runX * flatX);
    return ( anyY < cross ? true : false);
} //end( )
```

TABLE 6

```
private int do_LR_quadof_Virtual_Box( int driverFlatY, int riderFlatY )
{
/// =============================================================
```

TABLE 6-continued

```
/// Purpose: Given two flatY values in the LL Quadrant of the VBox,
///     divine a PlusMinus5000 value.
/// Function:
/// Status:
///Future:    smoosh these lines down for efficiency, and tune
///    add benefit for proximity to 'perfect match' line
/// =====================================================
/// pseudo code
/// using the greater of driverFlatY or riderFlatY (hiY)
/// calc runX as 100(one hundred is TB_LENGTH) minus hiY
/// divide runX by 50(fifty is ½ of TB_PRECISION)giving relative X
/// multiply that relative X * 1000(one thousand is VB_PRECISION)
/// since we're a MisMatch, make that a negative number
///giving PM 1000 :-)
int runX;
int pm 1000;
if ( driverFlatY > riderFlatY )
runX = TB_LENGTH–driverFlatY;
else
    runX = TB_LENGTH.–riderFlatY;
pm1000 = Convert.ToInt32( VB_PRECISION –
((runX*VB_PRECISION)/(TB_LENGTH/2)) );
if (pm1000 == 0) pm1000 = 1; // pm1000 values must never be zero,
because of later mathmatics
    return ( pm1000 * -1);
} //end( )
```

TABLE 7

```
private int do_LL_quad_of_Virtual_Box( int driverFlatY,
int riderFlatY )
{
/// =====================================================
/// Purpose: Given two flatY values in the LL Quadrant of the VBox,
///     divine a PlusMinus5000 value.
/// Function:
/// Status:
///Future:
/// =====================================================
/// pseudo code
/// using the greater of driverFlatY or riderFlatY(hiY) as runX
/// calc relative X value as runX divided by 50(fifty is 1/2 of
TB_PRECISION)
/// multiply that relative X * 1000(one thousand is VB_PRECISION)
/// giving PM5000 :-)
int pm1000;
if ( driverFlatY > riderFlatY )
    pm 1000 = Convert.ToInt32( VB_PRECISION –
    ((driverFlatY*VB_PRECISION) /
    (TB_LENGTH/2)) );
else
    pm1000 = Convert.ToInt32( VB_PRECISION –
    ((riderFlatY*VB_PRECISION) /
    (TB_LENGTH/2)) );
if (pm1000 == 0) pm1000 = 1; // pm1000 values must never be zero,
because of later mathmatics
    return pm1000;
} //end( )
```

TABLE 8

```
private int do_UR_quad_of_Virtual_Box( int driverFlatY,
int riderFlatY )
{
/// =====================================================
/// Purpose: Given two flatY values in the LL Quadrant of the VBox,
///     divine a PlusMinus5000 value.
/// Function:
/// Status:
///Future:
///
```

TABLE 8-continued

```
=====================================================
/// pseudo code
/// using the lesser of driverFlatY or riderFlatY (loY)
/// calc riseY as 100(one hundred is TB_LENGTH) minus loY
/// divide riseY by 50(fifty is ½ of TB_PRECISION)giving relative Y
/// multiply that relative Y * 1000(one thousand is VB_PRECISION)
/// since we're in the UR Quad, leave that number positive
/// giving PM1000 :-)
int pm1000;
if ( driverFlatY < riderFlatY )
    pm1000 = Convert.ToInt32( VB_PRECISION – (((TB_LENGTH–
    driverFlatY)* VB_PRECISION) / (TB_LENGTH/2)) );
else
    pm1000 = Convert.ToInt32( VB_PRECISION – (((TB_LENGTH–
    riderFlatY)* VB_PRECISION) / (TB_LENGTH/2)) );
if (pm1000 == 0) pm1000 = 1;
// pm1000 values must never be zero, because of later mathmatics
return pm1000;
} //end( )
```

The flatten process of the time-based digital resume aspirations matching process reduces the time-based aspirations selection criteria of both the time-based digital resume and the time-based digital job order, into discrete, static, and quantitative selection criteria ("flat Y" values). The flatten process takes its input from time-based selection criteria created thru the digital resume time-based process. Using this time-based selection criteria (the "Y" value) along with a single calendar date (the "X" value), the geometric mathematical algorithms are applied to derive one single static, discrete and quantitative selection criteria ("flat Y" value) for the given date.

The time-based digital resume virtual box process 170, 172, 174, 176, Tables 2-8 encompasses the theoretical and practical mathematical algorithms for assigning numerically quantitative matching numbers ("perfect match 1,000 numbers"), representative of the relative match or mismatch between the static selection criteria of one time-based digital résumé's "flat Y" value, and the static selection criteria of one time-based digital job order's "flat Y" value.

The prerequisite flatten process reduces the dynamic time-based aspiration selection criteria into static selection criteria (a "flat Y" value) ranging from zero to 100, with a midpoint of 50. The midpoint of 50 represents a default preference value, i.e.: a 'weak' preference. The zero and 100 values represent strong deflections of preference from the center point, either for or against a particular skill matching selection criterion.

The virtual box process is based on the concept that there is an 'ideal' match between the skills matching criteria of a particular time-based digital resume and the same skills matching criteria of a particular time-based digital job order. FIGS. 17 through 21 associate with the various steps, functions, and associated instructions for performing the virtual box process of the present invention. This 'ideal' match is called the 'perfect match 1,000', and ranges numerically from zero thru positive 1,000 (zero thru+1,000), or 'PM 1000' for shorthand. A PM 1000 value of zero indicates that the selection criteria of the time-based digital resume perfectly matched the selection criteria of the time-based digital job order, but neither one of the inputs placed any strength in their mutual selection criteria. A PM 1000 value of 1,000 indicates again that the selection criteria of the time-based digital resume perfectly matched the selection criteria of the time-based digital job order, and that each of the inputs placed the utmost strength in their mutual selection criteria (i.e.: this would occur when both selection criteria deflected their "flat Y" (time-based aspiration preference) to the utmost deflection into the same direction (both towards zero or both towards 100) away from the center point of 50). The virtual box process is also based on the concept that there is a 'worst case' mismatch between the skills matching criteria of a particular time-based digital resume, and the same skills matching criteria of a particular time-based digital job order.

This 'worst case' mismatch is expressed within the 'Perfect match 1,000', with the numerical ranges from negative 1,000 thru negative one (−1,000 thru −1), also 'PM1000' for shorthand. A PM 1000 value of −1 indicates that the selection criteria of the time-based digital resume absolutely mismatched the selection criteria of the time-based digital job order, but neither one of the inputs placed any strength in their opposing selection criteria. A PM 1000 value of −1,000 indicates again that the selection criteria of the time-based digital resume absolutely mismatched the selection criteria of the time-based digital job order, and that each of the inputs placed the utmost strength in their opposing selection criteria (i.e.: this would occur when both selection criteria deflected their "flat Y" (time-based aspiration preference) to the utmost deflection into the opposite direction (one towards zero and the other towards 100) away from the center point of 50). When the quantitative selection criteria ("flat Y" value) ranging from zero to 1,000 of one time-based digital resume is geometrically graphed against the quantitative selection criteria ("flat Y" value) of one time-based digital job order, a theoretical 'perfect match' occurs along the geometric line extending from the XY points of 0,0 thru 1000,1000; and an 'Absolute mismatch' occurs along the geometric line extending from the XY points of 0,1000 thru 1000,0. While anywhere along the 'perfect match' line represents an identical selection criteria input by both the time-based digital resume and the time-based digital job order, the numerical PM 1000 value increases from zero to 1,000 based on the emphasis suggested by the input static selection criteria. Likewise anywhere along the 'Absolute mismatch' line represents opposing selection criteria input by the time-based digital resume and the time-based digital job order, with numerical PM 1000 value assigned decreasing from −1 to −1,000 based on the opposing emphasis suggested by the input static selection criteria.

Included within the virtual box process is a functional "accuracy value", externalized for control by the users of both the time-based digital resume, and by the time-based digital job order. This "accuracy value" algorithmically tightens, or loosens the mathematical geometry which assigns matching and mismatching PM 1000 values. Setting a very high "accuracy value" insures that only very precisely matched "flat Y" values fall into the "matching" category. Setting a very low "accuracy value" insures that even distantly matched "flat Y" values fall into the "matching" category.

Included within the virtual box process is a functional "baseline value", externalized for control by the users of both the time-based digital resume, and by the time-based digital job order. This "baseline value" algorithmically sets a practical minimum numeric for the "accuracy value", to effect a built-in judiciousness to the 'highest' "accuracy value". Using a "baseline value" of 98% will effect a 2% leeway where any user requesting an "accuracy value" of 100% will still be found to 'match', and using a "baseline value" of 100% mandates that any user requesting an "accuracy value" of 100% will 'mismatch' with every selection criteria that is not the exact same zero to 100 preference value.

The time-based digital resume aspirations matching process includes a flatten process for reducing time-based selection criteria from the time-based digital resume and the time-based digital job order, into quantitative "flat Y" values, which represent non-time-based selection criteria similar to other discrete pieces of static user data commonly found in other skills matching software available today.

The time-based digital resume aspirations matching process includes a virtual box process for matching discrete pieces of static skills matching selection criteria from the time-based digital resume, against discrete pieces of static skills matching selection criteria from the time-based digital job order.

The time-based digital resume aspirations matching process includes a ranking process for prioritizing the match between any given time-based digital resume, and any given time-based digital job order.

The time-based digital resume aspirations matching process includes a matchbox process for manipulation and retention of skills matching selection criteria, once they are reduced into static data format thru the flatten process, matched thru the virtual box process, and prioritized thru the ranking process. User interfaces 192, 194, 196, and 198 are utilized in implementing some embodiments of the present invention.

The time-based digital resume aspirations matching process enables user control over the "accuracy" of the geometric mathematics used to for a match between the time-based digital resume and the time-based digital job order.

The time-based digital resume aspirations matching process enables user control over the "urgency" which the owner of the time-based digital resume, or the owner of the time-based digital job order feels in effecting a skills match.

The time-based digital resume aspirations matching process enables user control over the "emphasis" to place on "aspirations" over background skills matching selection criteria, during the analytical match between the time-based digital resume and the time-based digital job order.

The time-based digital resume aspirations matching process exposes interim data analytic facts as information to the user, by associating, correlating and ranking individual matching/mismatching/lacking/equaled data facts, and then depicting these results thru full-color graphical feedback reports.

The matchbox method provides the physical and virtual data schema into which the time-based digital resumes and time-based digital job orders are placed, prepared, flattened, backfilled and ranked. Each matchbox consists of two sets of four database tables: the half headers, the half recs, the rank recs, and the graph recs. One set of the four tables holds the flattened, matched and ranked time-based digital resumes, and the other set holds the flattened, matched, and ranked time-based digital job orders.

Figure 26:
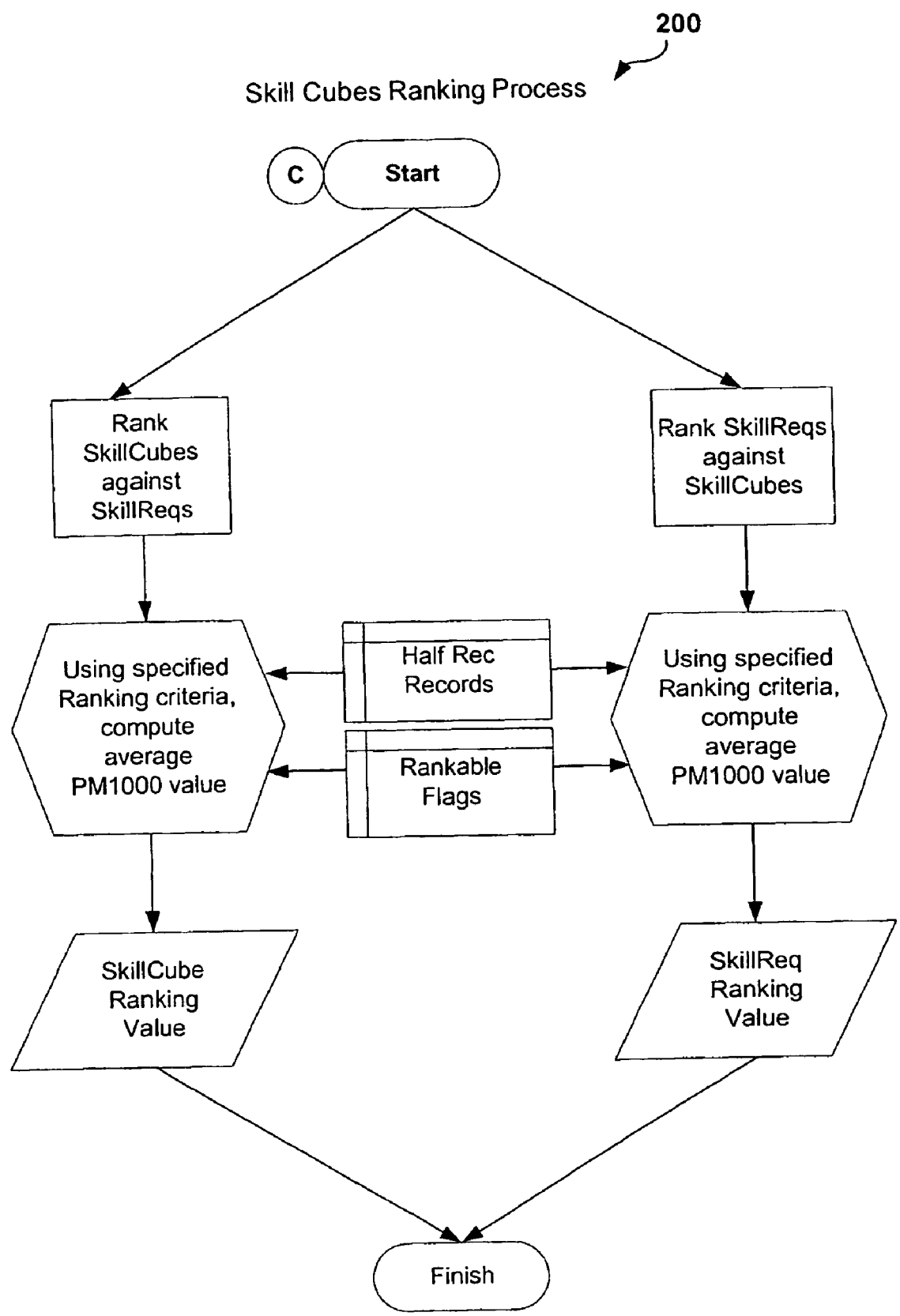
FIG. 26 provides a flow chart depicting the steps of the ranking method of the present invention.

The ranking process depicted as 200 (FIG. 26) and Tables 9 and 10 mathematically analyzes the numerical "PM 1000 Values" of the time-based digital job order and time-based digital resumes in the matchbox, to make informative recommendations of best fit relationships between digital resumes and digital job orders. The ranking method externalizes a set of control parameters called "rankable flags", to enable the runtime adjustment of those algorithms which analyze and match the "PM1000 Values" of the time-based digital resumes against the "PM 1000 Values" of the time-based digital job orders. There are 13 flags allowing the inclusion or inclusion of: importance, proficiency, preference, urgency, accuracy, spam, aspirations, pay, distance, travel, availability, healthcare and fulltime, to either effect or not-effect the ranking method analytics.

TABLE 9

```
private void assign__RankRecs__rankings( string clientName, double progress )
{
// ===================================================
/// Purpose:    Rank each Cube-Req grouping in the RankRecs table
/// Function:   Group the RankRecs into Cube-Req groupings. Then by including each of
///             the criteria which are set as "Rankable" average the pm1000's and assign ///  the Rank
/// Status: Knowingly exposed in that this routine caches EVERY single flatHS,PR,BE
///             row into an in-memory Rank Table before flushing it out! yikes!
/// Future:Clip Rank Table at some legitimate level(say 5,000 rows), and flush
///             it out into the MatchBox.
// ===================================================
double cubeProgress    = 0;
double reqProgress     = 0;
double flushProgress   = progress;
if (matchBox1.CubeRankRecs.Count + matchBox1.ReqRankRecs.Count > 0)
{
cubeProgress = ( matchBox1.CubeRankRecs.Count* progress
/(matchBox1.CubeRankRecs.Count+matchBox1.ReqRankRecs.Count)) * .8;
reqProgress = ( matchBox1.ReqRankRecs.Count * progress
/(matchBox1.CubeRankRecs.Count+matchBox1.ReqRankRecs.Count)) * .8;
    flushProgress = progress-cubeProgress-reqProgress;
    open__matchBox( clientName );
    // pseudo code
    // for each Cube/Req RankRec(ord) group, filter down to the 'isRankable' records
    // calculate the average pm1000 value within the Match Quadrant
    //
    // employers Spam?
    // employers Urgency?
    // employers Accuracy?
    // ============================
    //=Rank the pm1000 values within each rider, of each reportQuad, of each driver
    // ============================
    // ============================
    //=For The SkillCubes
    // ============================
    if ( matchBox1.CubeRankRecs.Count > 0 )
    {
    DataView criteriaView = new DataView(matchBox1.CubeRankRecs, "isRankable = true",
"driverHalfHeaderKey,    riderHalfHeaderKey", DataViewRowState.CurrentRows);
    if ( criteriaView.Count > 0 )
             set__rankings( (DataTable)matchBox1.CubeRankRecs, criteriaView );
    addProgress( cubeProgress); // update the progressBar
    }
    // ============================
    //=For The SkillReqs
    // ============================
    if ( matchBox1.ReqRankRecs.Count > 0 )
    {
    DataView criteriaView = new DataView(matchBox1.ReqRankRecs, "isRankable = true",
"driverHalfHeaderKey,    riderHalfHeaderKey", DataViewRowState.CurrentRows);
    if ( criteriaView.Count > 0 )
             set__rankings( (DataTable)matchBox1.ReqRankRecs, criteria View );
    addProgress( reqProgress); // update the progressBar
    }
}
flush__matchBox1( clientName, flushProgress );
} // end do__Matching( )
```

TABLE 10

```
private void set__rankings( DataTable table 1, DataView dv)
{
//=====================================================================
// Purpose:    Impliment a mock SQL Query/Group/Update statement.
// Function:   Group all RankRecs by into riders, and update them with a rank
//                 value equal to their average pm1000.
// Status:
//=====================================================================
int lastDriver    = Convert.ToInt32 ( dv[0]["driverHalfHeaderKey"] );
int lastRider     = Convert.ToInt32 ( dv[0]["riderHalfHeaderKey"] );
int rank          = -1;
int itemCount     = 0;
int itemTotal     = 0;
foreach( DataRowView criteriaRow in dv )
        {
//when this rider/driver group changes, recurse and update ALL table1
```

TABLE 10-continued

```
//(not just rankable records in dv)
        //records with this r/d pair with their calculated rank.
        if ( ( Convert.ToInt32(criteriaRow["riderHalfHeaderKey"]) != lastRider )
        ||( Convert.ToInt32(criteriaRow["driverHalfHeaderKey"]) != lastDriver ) )
        {
                // mark all riders associated with the last driver with their rank
                if ( rankingMethod == RANKINGMETHOD_QUALITY )
                        rank = itemTotal/itemCount; // manual AVG(reason) function
                else
                        rank = itemTotal; // manual SUM(reason) function
                DataView riderView = new DataView(table1, "driverHalfHeaderKey = "+
                lastDriver.ToString( ) +" AND riderHalfHeaderKey = "+ lastRider.ToString( ), "",
                DataViewRowState.CurrentRows );
                foreach( DataRowView rankRow in riderView )
                        rankRow["rank"] = rank;
                itemCount = 0;
                itemTotal = 0;
        }
        itemCount++;
        itemTotal += Convert.ToInt32(criteriaRow["reason"]);
        lastDriver   = Convert.ToInt32(criteriaRow["driverHalfHeaderKey"]);
        lastRider    = Convert.ToInt32(criteriaRow["riderHalfHeaderKey"]);
}
//=================
//=All thru - assign the final group it's Rank
//=================
if (itemCount>0)
{
        // mark all riders associated with the last driver with their rank
        if ( rankingMethod == RANKINGMETHOD_QUALITY )
                rank = itemTotal/itemCount; // manual AVG(reason) function
        else
                rank = itemTotal; // manual SUM(reason) function
        DataView riderView = new DataView(table1, "driverHalfHeaderKey = "+ lastDriver.ToString( ) +"
AND  riderHalfHeaderKey = "+ lastRider.ToString( ), "", DataViewRowState.CurrentRows );
        foreach( DataRowView rankRow in riderView )
                rankRow["rank"] = rank;
        }
}// end ( )
```

TIME-BASED DIGITAL RESUME SKILLS INFRASTRUCTURE METHOD AND SYSTEM: As FIG. 27 shows, the present invention provides a system 206 having digital resume private exchange for establishing a stand-alone platform for containing and matching time-based digital job orders and time-based digital resumes, as well as a front-end platform for interacting with the back-end public exchange thru the backfill and publish methods.

The present invention provides an on-site exchange that establishes both a stand-alone platform for containing and matching time-based digital job orders and time-based digital resumes, and a front-end platform for interacting with the back-end public exchange thru the backfill and publish methods.

The present invention further provides a digital resume public exchange that establishes a stand-alone platform for containing time-based digital resumes and matching them with time-based digital job orders made available from either a private exchange or an on-site exchange thru the publish or backfill methods.

Figure 27:
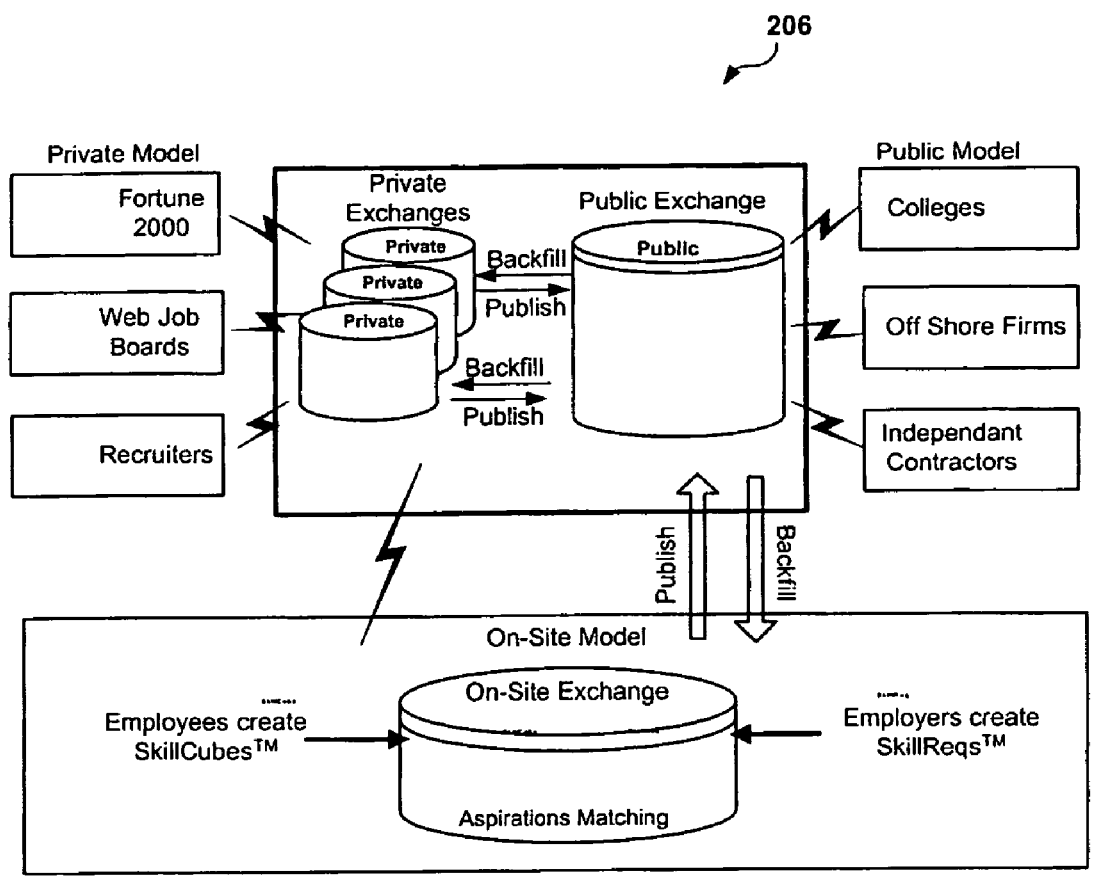
FIG. 27 illustrates one aspect of the national infrastructure functions of the present invention.

FIG. 27 further shows that the present invention provides digital resume private exchanges and on-site exchanges which may operate as stand-alone entities capable of retaining and matching internal time-based digital job orders with internal time-based digital resumes. The method and system permit the user to access and reach externally into the public exchanges for time-based digital resumes using a backfill and publish process. The digital resume public exchange operates as stand-alone support entity that includes the following functions:

1. Fulfilling digital job orders that are backfilled from either the private exchanges or the on-site exchanges;

2. Matching digital job orders that are published from either the private exchanges or the on-site exchanges;

3. Analytically matching digital resumes with digital job orders that originate in either a private exchange or an on-site exchange; and 4. Create a functionally interconnected national infrastructure.

Figure 28:
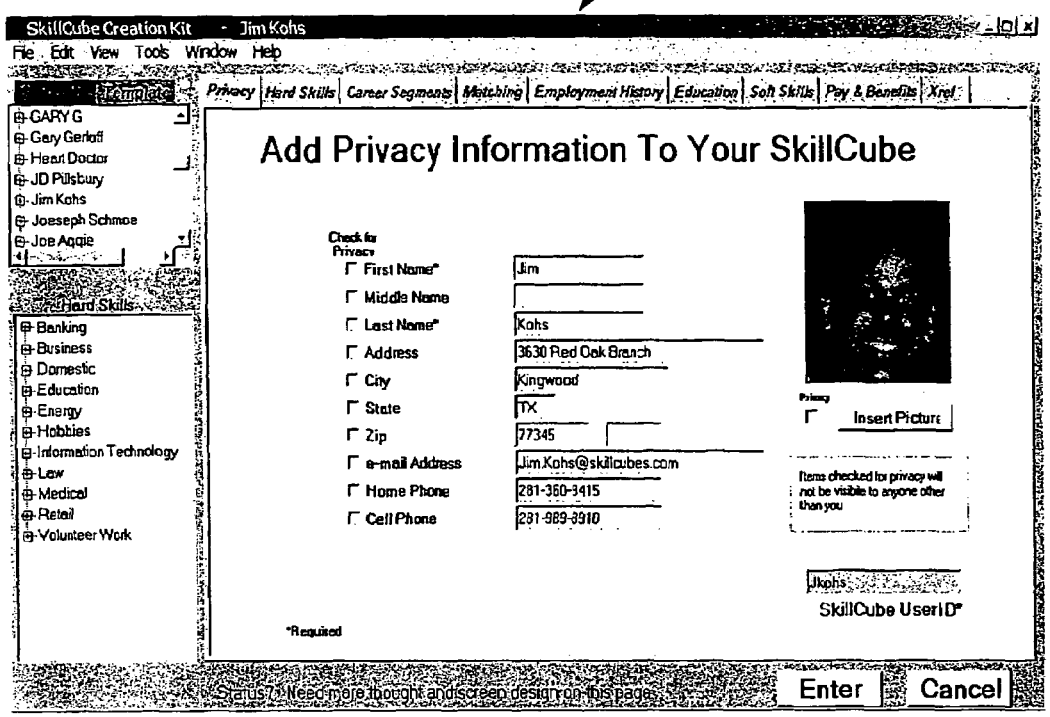
Figure 29:
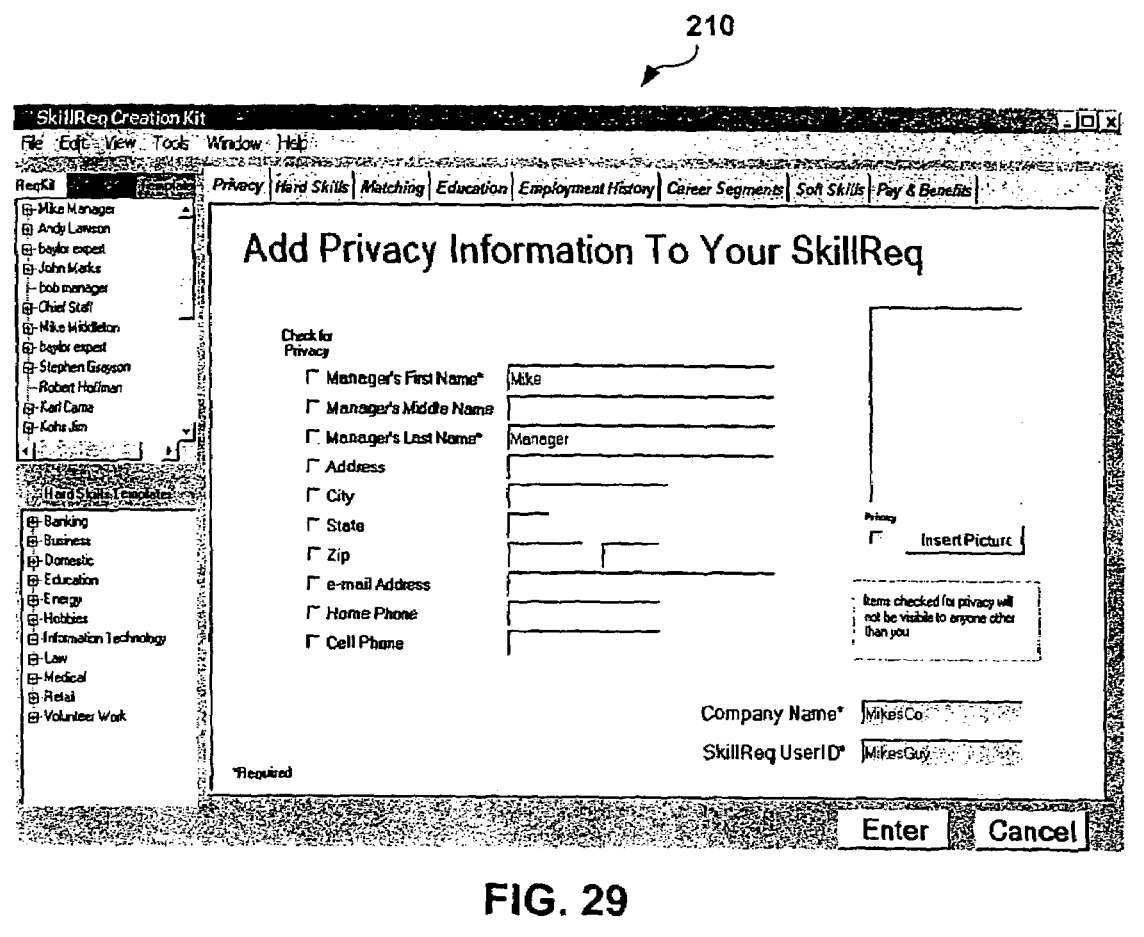

FIGS. 28 and 29, respectively, illustrate one embodiment of a time-based digital resume creation system having user interface 208 and time-based digital job requirement creation system having user interface 210 according to the teachings of the present invention. The time-based digital resume creation system and the time-based digital job requirement creation system are functions for building and maintaining time-based digital resumes and time-based digital job orders. Each of these functions implement elements of the time-base method of the present invention, the time-based digital resume flatten method, the time-based digital resume graphical feedback report process, and the digital resume infrastructure method.

The present invention further provides a teamed digital resume function and a teamed digital job order function, using object orientated software manifestations of the time-based digital resume and the time-based digital job requirement. The teamed digital resume instantiates the time-based digital resume into a 'team' of time-based digital resumes, in order to represent the consolidated time-based digital resumes of a full 'team'. The teamed digital job order instantiates the time-based digital job requirement into a 'team' of time-based digital job orders, in order to represent the consolidated time-based digital job orders for a full 'team'.

Still further the present invention provides a firm- or company-based digital resume function and digital job order function to provide an object orientated software manifestations of the teamed digital resume function and teamed digital job order function. The firm-based digital resume instantiates the team-based digital resume into a firm or company full of teamed digital resumes, in order to represent the consolidated time-based digital resumes of a full firm. The firm-based digital job order function instantiates the teamed digital job order into a firm full of teamed digital job orders, in order to represent the consolidated time-based digital job orders for a full firm.

Figure 30:
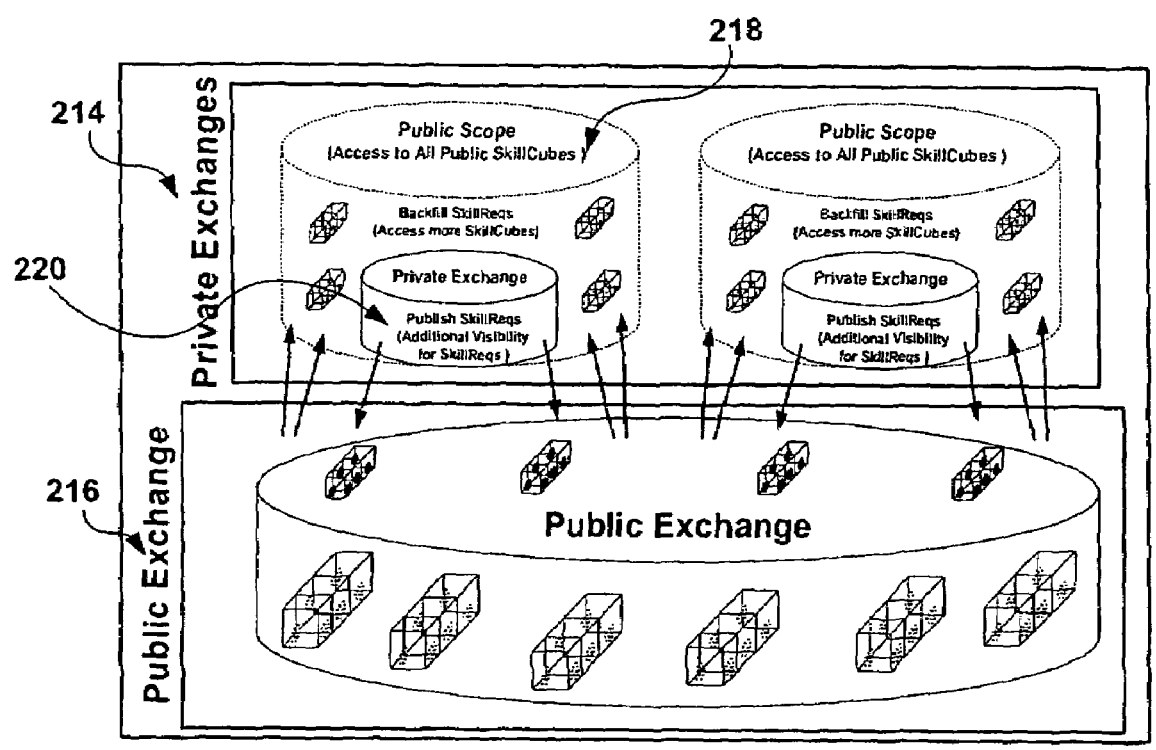
FIG. 30 shows the publishing and backfill methods of the present invention.

FIG. 30 shows a representation of the backfill process 212 of the present invention, which provides the algorithmic extension 214 for the private and on-site exchanges 220 to 'reach' out into the public exchange 216 and extract matching time-based digital resumes into a Public Scope 218, based on analytic inputs (minimum ranking values) and a single time-based digital job order. In addition, the present invention provides a publish process which is an algorithmic extension 212 of the private and on-site exchanges 220. These features extend the functionality of associated time-based digital job orders out beyond their own framework 220, and into the public exchange 216 for the purpose of exposing greater visibility of the time-based digital job order to time-based digital resumes.

Figure 31:
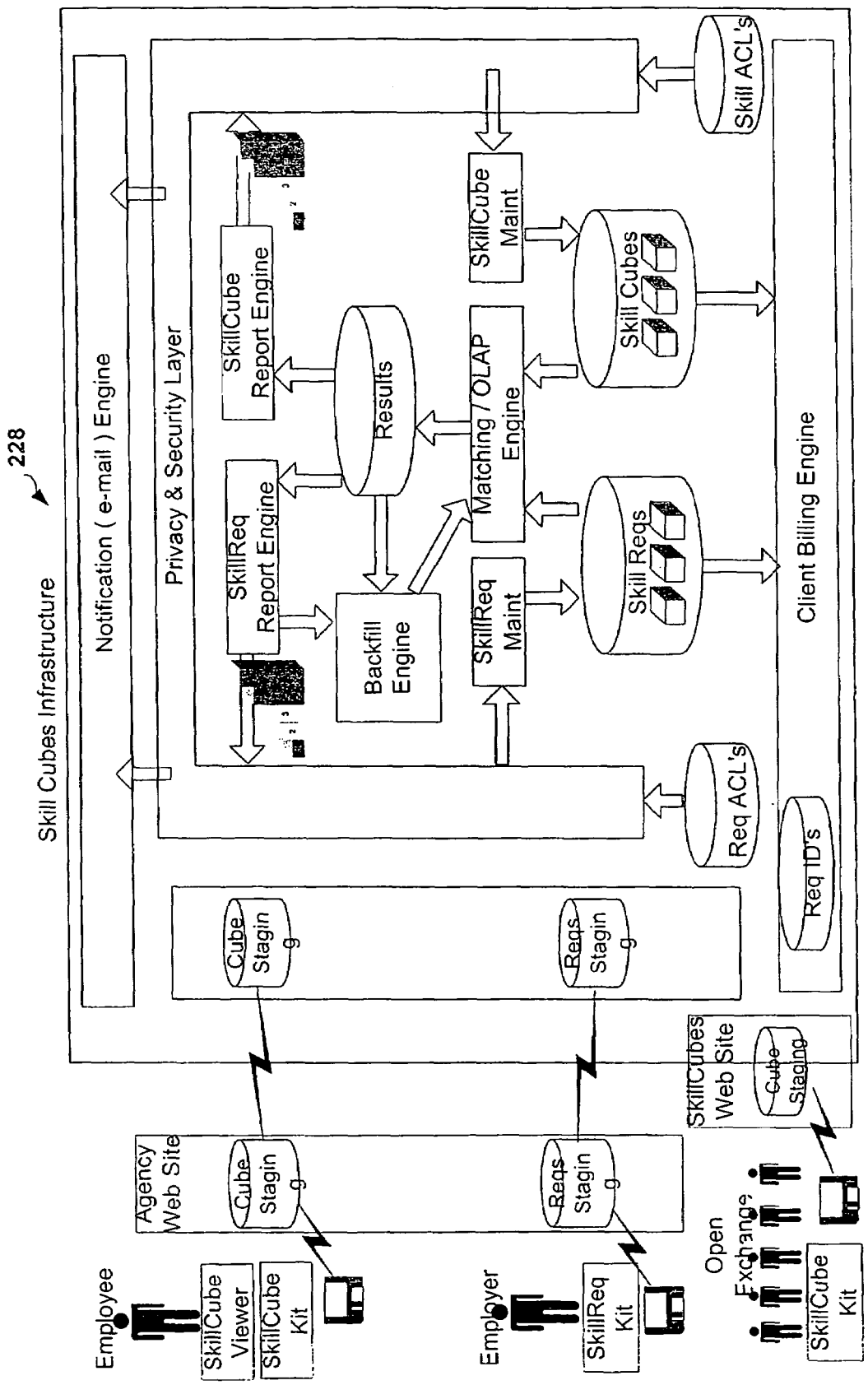
FIGS. 31 through 32 depict in further detail the digital resume infrastructure functions and associated architecture for the present invention.
Figure 32:
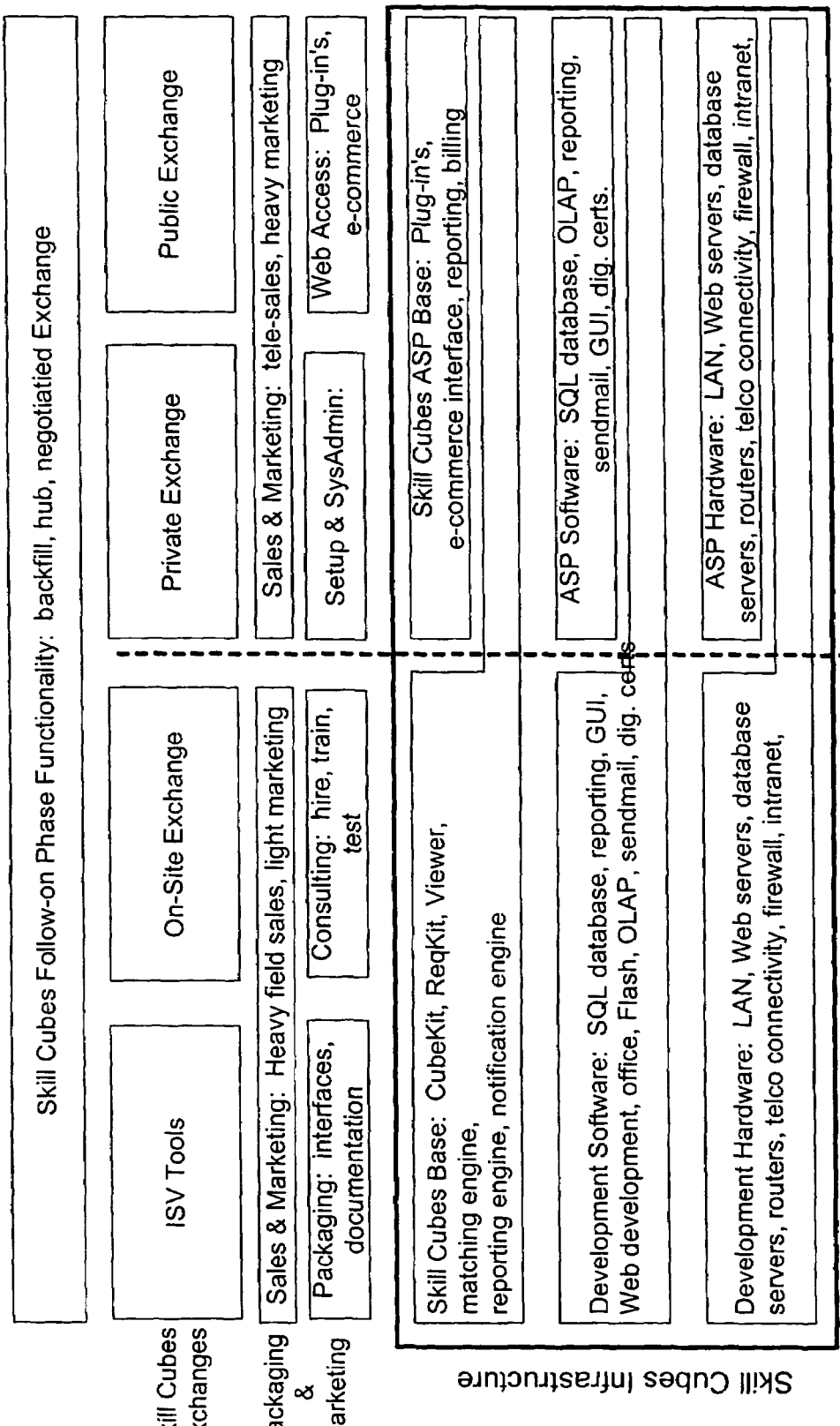
Figure 33:
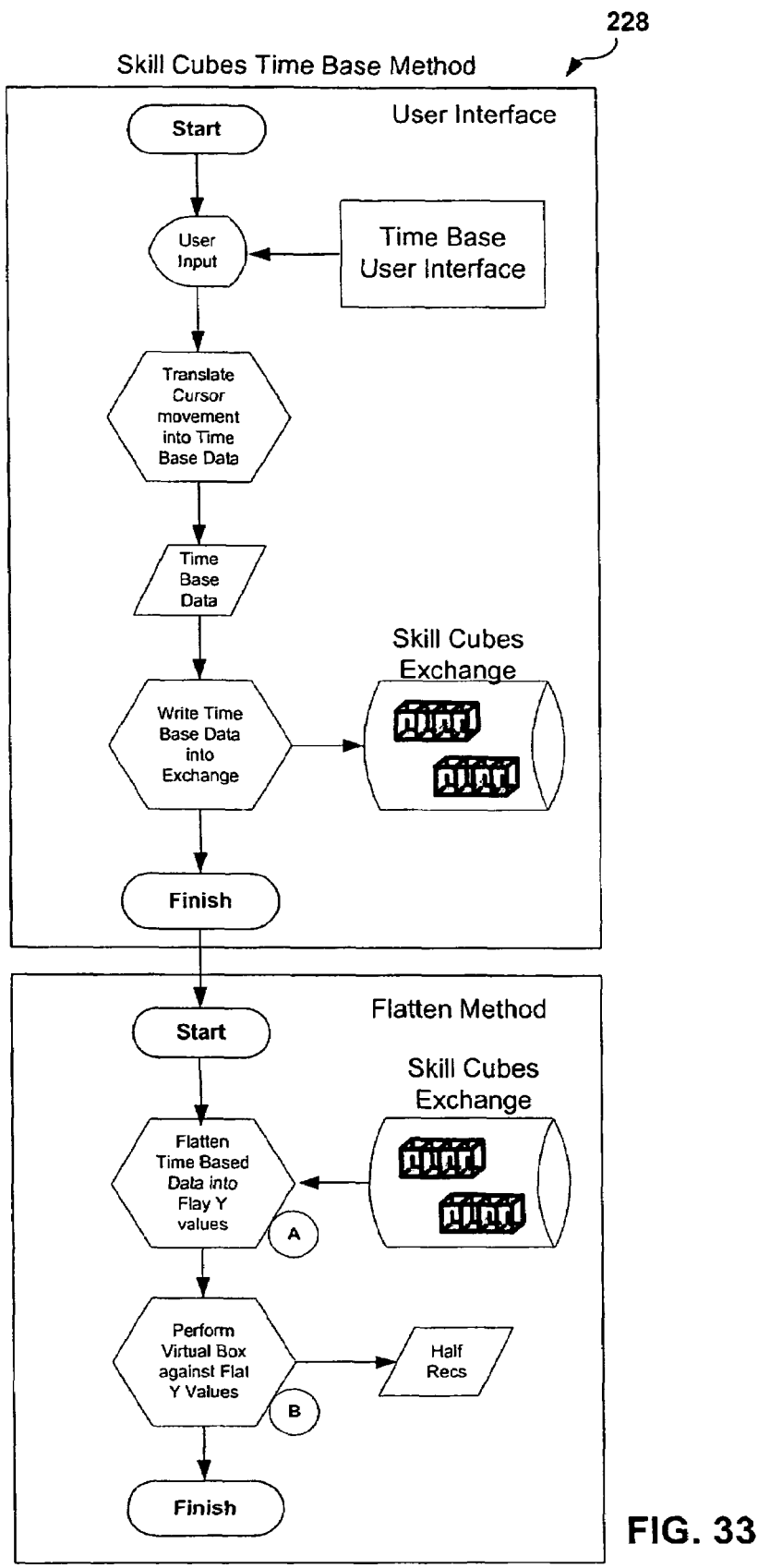
FIG. 33 provides a flow diagram for the time-base process of the present invention.

FIGS. 31 and 32, respectively present the infrastructure components 221 and the architecture 222 for time-based digital resume and time-based digital job order that the present invention provides. Thus, through the present invention, there are provided the following capabilities:

1. A national infrastructure within the field of human resources, for the exchange of standardized digital resumes;

2. A national infrastructure within the field of human resources, for the exchange of standardized digital job orders;

3. A process and associated system for interlinking skills matching databases belonging to disparate companies;

4. A process and associated system for locating the best-fit digital resume, from amongst many disparate corporate skills matching databases, herein referred to as backfilling;

5. A process and associated system for exposing digital job orders to a public database of digital resumes, herein referred to as publishing;

6. A time-based digital resume creation, modification, and management system;

7. A time-based digital job requirement creation, modification, and management system;

8. A method and system for creating and managing fill-color graphical feedback reports of workers;

9. An application server program for managing the human resources process and providing the above functions and features;

10. System of ISV tools for use in the human resources function;

11. A method and system for providing teamed digital resumes;

12. A method and system for providing firm-based digital resumes;

13. A method and system for matching time-based digital resumes with time-based digital job orders;

14. A method and system for generating full-color graphical feedback reports;

15. A method and system for improving the privacy of the automation in a digital human resources process;

16. A method and system of standard or template digital resumes;

17. A method and system of standard or template digital job orders;

18. XML standards for use with digital resumes and digital job orders;

19. A backfill method and system for use with time-based digital resumes and time-based digital job orders; and 20. A publishing method and system for processing time-based digital resumes and time-based digital job orders.

PROCESS FOR RECORDING TIME-BASED DIGITAL RESUME SELECTION CRITERIA AND TIME-BASED DIGITAL JOB ORDER SELECTION CRITERIA: The process of user input and data manipulation available in the known field of human resources skills matching, involve discrete pieces of static skills matching selection criteria selected from predefined lists presented to the user for selection through software user interface motifs, including but not limited to; the drop-down box, selection box, radio buttons, and check boxes. Quantifiable user input is also enabled thru software user interface motifs including but not limited to the slide bar/slider, and open data entry fields.

The current process of user input and data manipulation available in the known field of human resources skills matching are 'static,' and do not change on their own once they are input; they are not dynamic and "time-based." The digital resumes time-based process provides new graphical software user interface techniques and mathematic processes which enable user selection criteria to be dynamic, and change over a specified period of calendar time as directed by the user. The time-based process described herein, when applied to the field of human resources skills matching, allows candidates (building digital resumes) and employers (building digital job orders) to specify gradients of dynamic skills matching selection criteria, using a user specified period of calendar dates. As time progresses, the skills matching selection criteria effectively change in a dynamic fashion without further user input. The time-based process described herein is incorporated within the digital resume formation process and system for creation of dynamic time-based digital resumes, and into the digital job order formation process and system for creation of dynamic time-based digital job orders, and into the digital resumes matching engine for matching time-based digital resumes to time-based digital job orders.

1. Forms a part of the digital resume formation process and system, which produces time-based digital resumes.

2. Forms a part of the digital job order formation process and system, which produces time-based digital job orders.

3. Forms a part of the digital resumes aspirations matching process which matches time-based digital resumes to time-based digital job orders.

4. Presents a unique graphical user interface which enables users of time-based digital resumes and time-based digital job orders, to specify dynamic time-based selection criteria.

5. Provides a graphical user interface process for specifying skills matching selection criteria, into the field of human resources.

6. Provides a set of geometric mathematical processes into the field of human resources skills matching, for reducing and reconstituting time-based selection criteria input by users, and output into skills matching analytics software.

7. Accepts graphical user interface input through a computer mouse and keyboard from a user (creation of a time-based digital resume, or creation of a time-based digital job order), including a calendar start date, a calendar end date, and a definable series of X axis and Y axis points, representative of the change in user selection criteria over a period of time.

8. Enables otherwise static skills matching selection criteria to behave dynamically over a described period of time without further user input.

One example of time-based matching using the present invention is the following. Consider a consulting firm's internal skills matching process for allocating resources to contracts effects their green revenue dollars. Consultants sitting 'on the bench' with low utilization rates turn an otherwise profitable revenue business into an expense problem. The following scenario brings together a qualified consultant with a consulting firm's signed contract.

Table 11 relates to the time-based process of the present invention. The digital resumes time-based process 228 includes both a graphical computer user interface for entering time-based selection criteria, and a set of geometric mathematical processes for reducing and reconstituting the time-based user selection criteria to/from an interim computer data storage device.

TABLE 11

```
private int flatten__Cube__TimeBase ( Cube.TimeBaseDataTable tbT, string skUID, string tbType )
{return ( flatten__Cube__TimeBase ( tbT, skUID, tbType, "", "", "" ) ); }
private int flatten__Cube__TimeBase ( Cube.TimeBaseDataTable tbT, string skUID,
string tbType,
         string id1, string id2, string id3 )
{
///===========================================================================
/// Purpose: Translate a set of TimeBase Points over a given time span,
///     into a singular Y value representative of the Yvalue on the
///             given runDate of this Matching Engine execution.
/// Function:
/// Status:
///    Future:
///===========================================================================
    Point[ ] myPoints = new Point[10];
    Cube.TimeBaseRow tbRow = tbT.FindByskUIDtbTypeid1id2id3 ( skUID, tbType,
id1, id2, id3 );
    if ( tbRow == null)
    {
        dbError dbe = new dbError( );
        dbe.text1Label.Text = "in flatten__Cube__timebase( ) – tbRow is null ";
        dbe.text2Label.Text = "skUID: "+skUID;
        dbe.text3Label.Text = "Plus: id1 ("+id1+"), id2("+id2+"),
id3("+id3+"), tbType("+tbType+")";
        dbe.ShowDialog ( );
        dbe.Dispose( );
        return ( );
    }
    // ====================================
    // if runDate is before/after the TB span, then return the Y0/Y9 value and
we're thru
    // ====================================
    if ( runDate <= tbRow.startDate )
        return tbRow.Y0;
    else if ( runDate >= tbRow.endDate )
        return tbRow.Y9;
    // ====================================
    // so we're within the TBspan(not befor X0, or after X9. find the
appropriate segment,
    // and calculate the Yvalue
    // ====================================
    myPoints[0].X    = tbRow.X0;
    myPoints[1].X    = tbRow.X1;
    myPoints[2].X    = tbRow.X2;
    myPoints[3].X    = tbRow.X3;
    myPoints[4].X    = tbRow.X4;
    myPoints[5].X    = tbRow.X5;
    myPoints[6].X    = tbRow.X6;
    myPoints[7].X    = tbRow.X7;
    myPoints[8].X    = tbRow.X8;
    myPoints[9].X    = tbRow.X9;
    myPoints[0].Y    = tbRow.Y0;
    myPoints[1].Y    = tbRow.Y1;
    myPoints[2].Y    = tbRow.Y2;
    myPoints[3].Y    = tbRow.Y3;
    myPoints[4].Y    = tbRow.Y4;
    myPoints[5].Y    = tbRow.Y5;
    myPoints[6].Y    = tbRow.Y6;
    myPoints[7].Y    = tbRow.Y7;
    myPoints[8].Y    = thRow.Y8;
    myPoints[9].Y    = tbRow.Y9;
    return ( flatten( myPoints, tbRow.numPoints, tbRow.startDate, tbRow.endDate ) );
}
private int flatten__Req__TimeBase( Req.ReqTimeBaseDataTable tbT, string companyName, string skrUID, string tbType )
```

TABLE 11-continued

```
        {return ( flatten_Req_TimeBase( tbT, companyName, skrUID, tbType, "", "", "" )); }
private int flatten_Req_TimeBase( Req.ReqTimeBaseDataTable tbT, string companyName, string skrUID,
string tbType, string id1, string id2, string id3 )
        }
///=========================================================================
/// Purpose: Translate a set of TimeBase Points over a given time span,
///   into a singular Y value representative of the Yvalue on the
///   given runDate of this Matching Engine execution.
/// Function:
/// Status:
/// Future:
///=========================================================================
Point[ ] myPoints = new Point[10];
Req.ReqTimeBaseRow tbRow = tbT.FindBycompanyNameskrUIDtbTypeid1id2id3( companyName, skrUID, tbType, id1,
id2, id3 );
        if ( tbRow == null)
        {
            dbError dbe = new dbError( );
            dbe.text1Label.Text = "in flatten_req_timebase( ) – tbRow is null";
            dbe.text2Label.Text = "Company Name: "+companyName;
            dbe.text3Label.Text = "skrUID: "+skrUID;
            dbe.text4Label.Text = "Plus: "+id1+", "+id2+", "+id3+", "+tbType;
            dbe.ShowDialog( );
            dbe.Dispose( );
            return ( );
        }
//==============================
//if runDate is before/after the TB span, then return the Y0/Y9 value and we're thru
//==============================
if ( runDate <= tbRow.startDate )
    return tbRow.Y0;
else if( runDate >= tbRow.endDate )
    return tbRow.Y9;
//==============================
// so we're within the TBspan(not befor X0, or after X9.
// find the appropriate segment, and calculate the Yvalue
//==============================
myPoints[0].X   = tbRow.X0;
myPoints[1].X   = tbRow.X1;
myPoints[2].X   = tbRow.X2;
myPoints[3].X   = tbRow.X3;
myPoints[4].X   = tbRow.X4;
myPoints[5].X   = tbRow.X5;
myPoints[6].X   = tbRow.X6;
myPoints[7].X   = tbRow.X7;
myPoints[8].X   = tbRow.X8;
myPoints[9].X   = tbRow.X9;
myPoints[0].Y   = tbRow.Y0;
myPoints[1].Y   = tbRow.Y1;
myPoints[2].Y   = tbRow.Y2;
myPoints[3].Y   = tbRow.Y3;
myPoints[4].Y   = tbRow.Y4;
myPoints[5].Y   = tbRow.Y5;
myPoints[6].Y   = tbRow.Y6;
myPoints[7].Y   = tbRow.Y7;
myPoints[8].Y   = tbRow.Y8;
myPoints[9].Y   = tbRow.Y9;
        return ( flatten( myPoints, tbRow.numPoints, tbRow.startDate, tbRow.endDate ) );
        }
private int flatten( Point[ ] myPoints, int numPoints, DateTime startDate, DateTime endDate )
        {
///=========================================================================
/// Purpose: Translate a set of TimeBase Points over a given time span,
///   into a singular Y value representative of the Yvalue on the
///   given runDate of this Matching Engine execution.
/// Function:
/// Status:
///   Future:
///=========================================================================
float flatY;
float flatX;
float segmentrunPercent;
float segmentrise;
float runX;
float riseY;
long tbTicks;
long runDateTicks;
// determine # of ticks between tbRow.end and tbRow.start
// determine where before/middle/end of start-end spread, that the runDate falls
```

TABLE 11-continued

```
// grab those two tbPoints(left & right), build a rise/run box, reconcile rise to get flatY value
tbTicks       = endDate.Date.Ticks − startDate.Date.Ticks;
runDateTicks  = runDate.Date.Ticks − startDate.Date.Ticks;
flatX         = (runDateTicks* TB_LENGTH/*100 or 1000*/) / tbTicks;
//================================================================
// identify the TB segment which bounds the given runDate
// use the flatX to geometrically slice the virtual box of the TB segment
//================================================================
int i;
for (i = 1; i< numPoints; i++)
     if( myPoints[i].X >= flatX ) break; // loop to find the appropriate TB segment
/// pseudo code
//since we're here, there's a point[i] on our right, and a point on our left[i-1]
//calculate the runx as the run distance between the leftX and rightX
//calculate the riseY as the rise distance between the leftY and rightY
//calculate the segmentrunPercent(how far into the runX is the flatX?)
//then apply the segmentrunPercent(as a geometirc equivilant %(rise%=run%) )to the riseY giving segmentrise
//Giving: the flatY as the leftY plus the riseY :-) Whew !
     runX              = myPoints[i].X − myPoints[i-1].X;
riseY             = myPoints[i].Y − myPoints[i-1].Y;
segmentrunPercent = (flatX − myPoints[i-1].X)/runX;
//bug segmentrunPercent = flatX/runX;
segmentrise    = riseY * segmentrunPercent;
flatY = myPoints[i-1].Y + segmentrise;
if ( flatY > 100)
    flatY = 100;
else if (flatY < 0)
    flatY= 0;
    return (Convert.ToInt32( flatY ));
} //end( )
```

The digital resumes time-based process user interface represents a unique and novel process for entering dynamic skills matching selection criteria, using a computer mouse, screen and keyboard. The graphical computer user interface enables selection of an initial calendar start date, an ending calendar end date, and a user defined series of gradient X axis and Y axis points on a graph. Using the computer mouse, the user manipulates the gradient X axis and Y axis points on the graph, or the segments between those graph points as a process of dynamically basing their skills matching selection criteria on 'time'.

The flatten process 156 of the present invention reduces the dynamic time-based selection criteria of both the digital resume and the digital job order into discrete, static, quantitative selection criteria ("flat Y" values). Geometric mathematics are applied to dynamic time-based skills matching selection criteria, along with a specific calendar run date, to flatten the dynamic criteria into a single quantifiable "flat Y" value. If the specific calendar date precedes the timeline start date of the time-based criteria, then the "flat Y" value associated with an X axis value defined by the start date results. If the specific calendar date exceeds the end date timeline of the time-based criteria, then the "flat Y" value associated with the X axis value defined by the end date results. For all calendar dates which fall within the timeline between the time-based start date and the time-based end date, the following geometric mathematics are applied:

1) Use the specified calendar date to index into the time-based timeline, between the start date and end date;

2) Locate the specific time-based segment as defined by a selection criteria preference value less than (on the left of), and the next calendar selection preference value greater than (on the right of) the specified calendar date;

3) Use the specified calendar date to index into the specific time-based segment to derive a percentage value of X axis or 'run value';

4) Determine the delta Y 'rise value' distance between the time-based Y axis point values associated with the calendar date less than the specified calendar date, and the time-based Y axis point values associated with the calendar date greater than the specified calendar date;

5) Derive the resultant static "flat Y" value by applying the X axis 'run value' percentage to that of the Y axis 'rise value'.

FULL-COLOR GRAPHICAL FEEDBACK REPORTING BETWEEN TIME-BASED DIGITAL RESUMES AND TIME-BASED DIGITAL JOB ORDERS: The full-color graphical feedback report described herein informs users of time-based digital resumes, and users of time-based digital job orders of the interim analytic factors causing a "match" during the skills matching and ranking process.

The method and system represents a unique and novel technique of informing users of time-based digital resumes, and users of time-based digital job orders of the interim analytic factors causing a "mismatch" during the skills matching and ranking process. The present invention informs users of time-based digital resumes and users of time-based digital job orders of the interim analytic factors "lacking" during the skills matching and ranking process. The present invention informs users of time-based digital resumes and users of time-based digital job orders of the interim analytic factors "equaled" during the skills matching and ranking process. Moreover, the present invention informs users of time-based digital resumes, and users of time-based digital job orders of the location within a national infrastructure of disconnected repositories, where their "best fit" skills match can be located. Mathematical algorithms within the field of human resources skills matching depict strengths & weaknesses of 'matching', 'mismatching', 'lacking', and 'equaled' data points within a single graphical report.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer network system for facilitating the creation of time-dependent electronic proposals and the matching thereof, the system comprising:
    a computer readable storage medium comprising a plurality of time-dependent electronic proposals, each of said time-dependent electronic proposals comprising:
        at least one automatically updating time-variant field comprising:
            a calendar start date field;
            a calendar end date field; and
            a plurality of coordinate data pairs which comprise a date value and a magnitude value, wherein the magnitude value associates with a user selection criterion, the data being suitable for dynamic time-dependent variance of values associated with said at least one time-dependent electronic proposal;
    at least one exchange for receiving, containing, and matching said plurality of time-dependent electronic proposals, said at least one exchange for matching said plurality of time-dependent electronic proposals based on said at least one time-variant field;
    wherein said at least one time-dependent electronic job order and/or at least one time-dependent electronic resume further comprises aspirations data, said aspirations data providing information regarding career aspirations; and
    an interface associated with said at least one exchange, said interface for creating, updating, and viewing said plurality of time-dependent electronic proposals.

2. The system of claim 1, wherein said plurality of time-dependent electronic proposals comprises at least one time-dependent electronic job order and/or at least one time-dependent electronic resume.

3. The system of claim 2, further comprising:
    means for enabling third-party proprietary software, which matches at least one electronic resume to at least one electronic job order, to implement said at least one time-variant field.

4. The system of claim 2, further comprising:
    means for enabling third-party proprietary software, which forms matches between electronic resumes and electronic job orders, to communicate with said at least one time-dependent electronic resume and said at least one time-dependent electronic job order contained in said at least one exchange.

5. The system of claim 2, further comprising:
    means for enabling all third-party skills matching software vendors to access full-color graphical feedback reports generated by matching said plurality of electronic proposals.

6. The system of claim 1, further comprising means for interlinking a plurality of exchanges.

7. The system of claim 6, wherein said means for interlinking a plurality of exchanges further comprises a full-time public network.

8. The system of claim 6, wherein said at least one exchange further comprises an on-site exchange, a private exchange, and/or a public exchange.

9. The system of claim 8, wherein said plurality of time-dependent electronic proposals may be matched based on time-dependent electronic proposals included in any of said on-site exchange, said private exchange, or said public exchange.

10. The system of claim 1, wherein said plurality of time-dependent electronic proposals further comprises one or more standardized templates adapted to facilitate the creation of said at least one time-variant field.

11. The system of claim 1, wherein the contents of said plurality of time-dependent electronic proposals is configured in accordance with redefined XML standards.

12. The system of claim 1, further comprising:
    means for maintaining privacy and anonymity between any two parties using said plurality of time-dependent electronic proposals.

13. The system of claim 1, wherein said at least one exchange further matches said plurality of time-dependent electronic proposals based on a single numerical value generated given a single time.

14. The system of claim 1, wherein said interface further comprises a Virtual Box, said Virtual Box graphically presenting match values between two time-dependent electronic proposals.

15. A time-basing method for use with a computer processing system in facilitating preprogrammed time-dependent variation in an electronic proposal, comprising the steps of:
    receiving in a computer processing system time-variant input data including a calendar start date, a calendar end date, and a plurality of coordinate data pairs which comprise a date value and a magnitude value, wherein the magnitude value associates with a user selection criterion, the data being suitable for dynamic time-dependent variance of values associated with at least one time-dependent electronic proposal;

wherein said at least one time-dependent electronic proposal further comprises at least one electronic resume, said at least one time-dependent electronic resume further comprising aspirations data, said aspirations data providing information regarding career aspirations;

storing in said computer processing system said at least one time-dependent electronic proposal;

said time-variant input data automatically updating said time-dependent electronic proposal;

comparing in said computer processing system said at least one time-dependent electronic proposal to one or more other proposals; and calculating in said computer processing system a match value for each comparison of said at least one time-dependent electronic proposal to said one or more other proposals.

16. The method of claim 15, wherein said aspirations data further comprises time-variant input data.

17. The method of claim 15, wherein said at least one time-dependent electronic proposal comprises a time-dependent electronic job order and said one or more other proposals comprise electronic resumes.

18. The method of claim 15, further comprising the step of:
decomposing in said computer processing system said time-variant input data into corresponding static data which inherently includes the time-variant data but is not in time-variant format.

19. The method of claim 18, further comprising the step of:
utilizing in said computer processing system the decomposed data in comparing electronic proposals to enable otherwise static skills matching selection criteria to behave dynamically over a described period of time without further user input.

20. The method of claim 15, further comprising the step of generating in said computer processing system full-color graphical feedback reports depicting said match value.

* * * * *

UNITED STATES PATENT AND TRADEMARK OFFICE
CERTIFICATE OF CORRECTION

PATENT NO.      : 7,624,159 B2                                              Page 1 of 1
APPLICATION NO. : 10/555915
DATED           : November 24, 2009
INVENTOR(S)     : Jim Kohs It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this

Twenty-sixth Day of October, 2010

David J. Kappos
*Director of the United States Patent and Trademark Office*